US012593349B2

(12) United States Patent     (10) Patent No.: US 12,593,349 B2

Chitrakar et al.     (45) Date of Patent: Mar. 31, 2026

(54) COMMUNICATION APPARATUS AND COMMUNICATION METHOD FOR PRIORITIZED TRAFFIC

(71) Applicant: Panasonic Intellectual Property Corporation of America, Torrance, CA (US)

(72) Inventors: Rojan Chitrakar, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 369 days.

(21) Appl. No.: 18/254,789

(22) PCT Filed: Oct. 21, 2021

(86) PCT No.: PCT/SG2021/050641

§ 371 (c)(1),
(2) Date: May 26, 2023

(87) PCT Pub. No.: WO2022/119497

PCT Pub. Date: Jun. 9, 2022

(65) Prior Publication Data

US 2024/0032089 A1    Jan. 25, 2024

(30) Foreign Application Priority Data

Dec. 4, 2020    (SG) ............................ 10202012139Q

(51) Int. Cl.
*H04W 72/12*     (2023.01)
*H04W 72/566*     (2023.01)
*H04W 84/12*     (2009.01)

(52) U.S. Cl.
CPC ......... *H04W 72/569* (2023.01); *H04W 72/12* (2013.01); *H04W 84/12* (2013.01)

(58) Field of Classification Search
CPC .............................. H04W 84/12; H04W 72/12
(Continued)

(56) References Cited

U.S. PATENT DOCUMENTS

2014/0204821 A1    7/2014   Seok et al.
2021/0144778 A1    5/2021   Cherian et al.
(Continued)

FOREIGN PATENT DOCUMENTS

CN     102547866 A    7/2012
JP     2015501587 A    1/2015
(Continued)

OTHER PUBLICATIONS

Das et al., "Priority Access Support in IEEE 802.11be: What and Why?," doc.: IEEE 802.11-19/1901r4, Nov. 2019, 19 pages.
(Continued)

*Primary Examiner* — Angel T Brockman

(74) *Attorney, Agent, or Firm* — Seed Intellectual Property Law Group LLP

(57) ABSTRACT

The present disclosure provides a communication apparatus and a communication method for prioritized traffic. The communication apparatus, comprising: a receiver, which, in operation, receives from another communication apparatus a notification of one or more priority service periods (SPs), each SP being a time period in which only frames belonging to a traffic type designated by the other communication apparatus are allowed to be transmitted; and circuitry, which, in operation, determines if at least one frame of the designated traffic type is to be transmitted in one of the one or more SPs, and refrains from transmitting during the one of the one of more SPs in response to the determination that there are no frames of the designated traffic type to be transmitted.

15 Claims, 23 Drawing Sheets

(58) Field of Classification Search
USPC ............................................................ 370/329
See application file for complete search history.

(56) References Cited

U.S. PATENT DOCUMENTS

| | | |
|---|---|---|
| 2022/0132370 A1 | 4/2022 | Wakao et al. |
| 2023/0262768 A1 | 8/2023 | Ko et al. |

FOREIGN PATENT DOCUMENTS

| | | | |
|---|---|---|---|
| WO | WO 2020013874 A1 | 1/2020 | |
| WO | WO 2020179533 A1 | 9/2020 | |
| WO | 2022075821 A1 | 4/2022 | |

OTHER PUBLICATIONS

Singaporean Written Opinion dated Jan. 5, 2024, for the corresponding Singaporean Patent Application No. 11202303976V, 7 pages.
Baron et al., "Low-Latency Triggered TWT," Canon, doc.: IEEE 802.11-20/1843r0, Nov. 11, 2020. (12 pages).
Extended European Search Report, dated May 21, 2024, for European Patent Application No. 21901146.7-1215. (11 pages).
Das et al., "Priority Access Support Option for NS/EP Services," IEEE 802.11-20-0463/r3, Mar. 15, 2020. (17 pages).
International Search Report, mailed Jan. 13, 2022, for International Patent application No. PCT/SG2021/050641. (4 pages).
Sakoda et al., "Low latency streaming capability for game applications," IEEE 802.11-19/0430r0, Mar. 12, 2019. (11 pages).
Stanton et al., "Time-Sensitive Applications Support in EHT," IEEE 802.11-19/0373r0, Mar. 10, 2019. (18 pages).

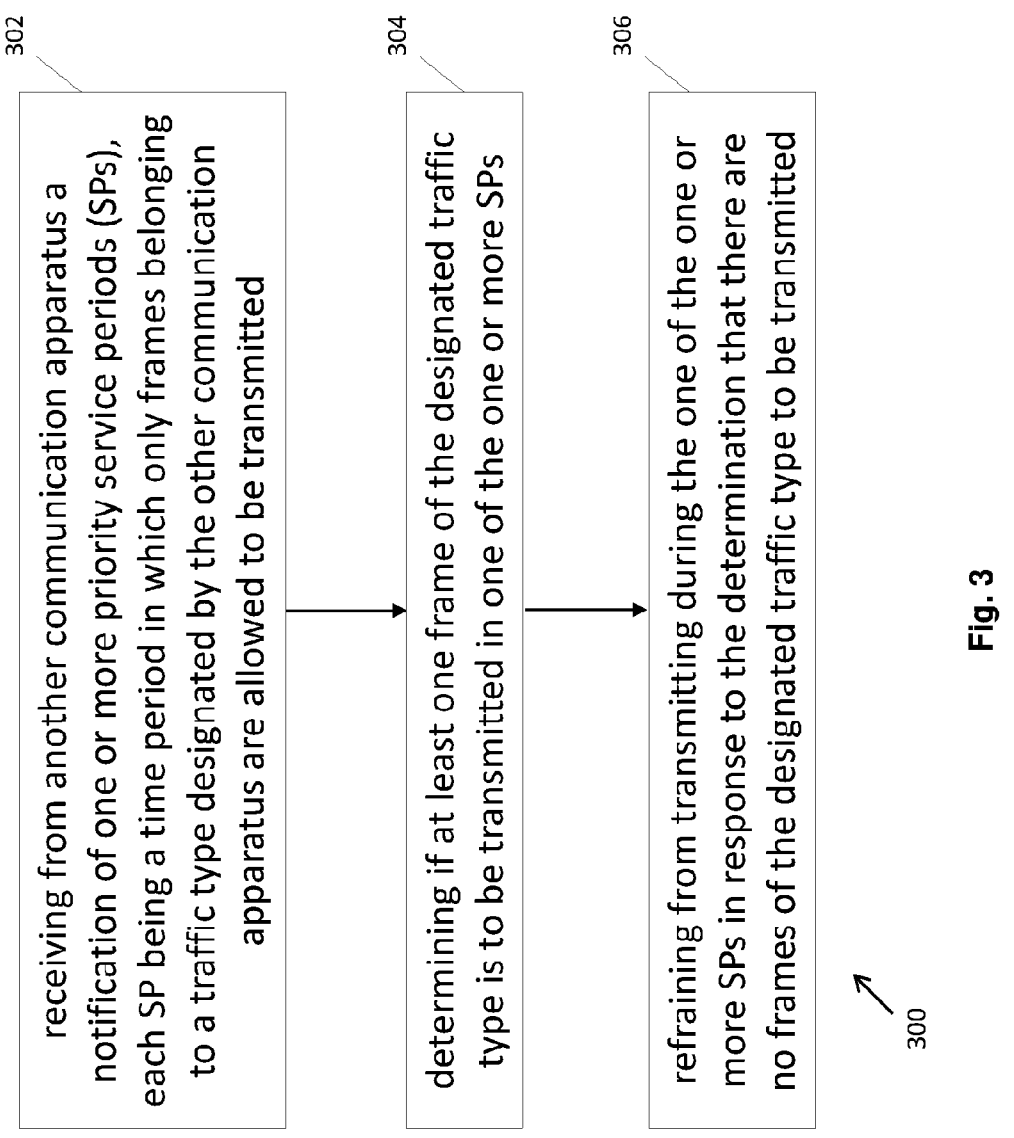

302 receiving from another communication apparatus a notification of one or more priority service periods (SPs), each SP being a time period in which only frames belonging to a traffic type designated by the other communication apparatus are allowed to be transmitted 304 determining if at least one frame of the designated traffic type is to be transmitted in one of the one or more SPs 306 refraining from transmitting during the one of the one or more SPs in response to the determination that there are no frames of the designated traffic type to be transmitted

Figure 8:
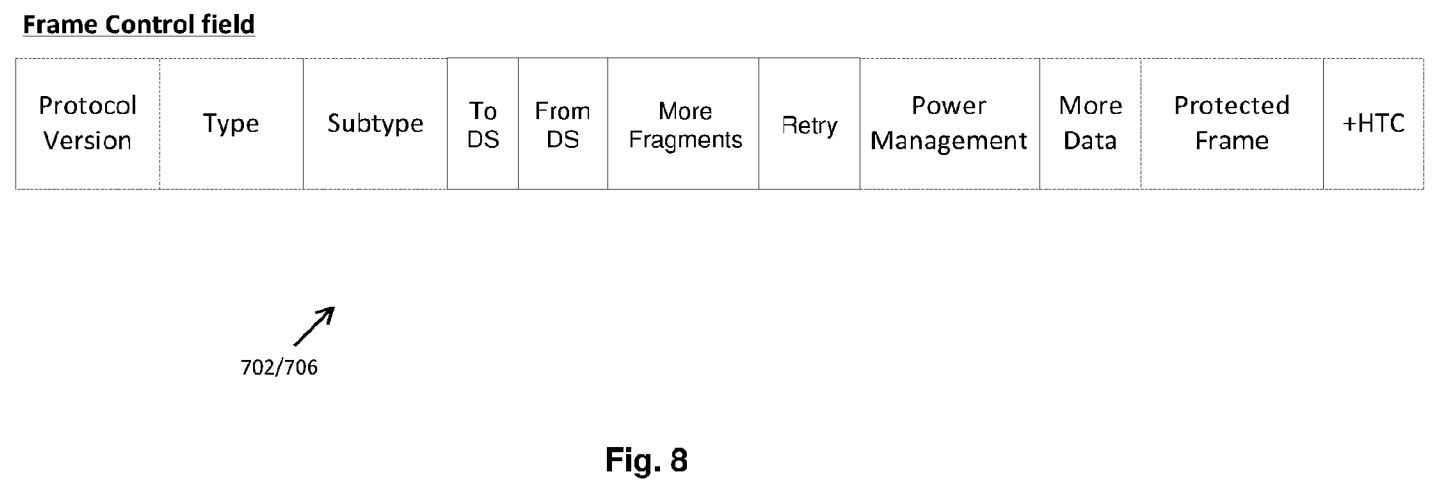

Frame Control field

| Protocol Version | Type | Subtype | To DS | From DS | More Fragments | Retry | Power Management | More Data | Protected Frame | +HTC |
|---|---|---|---|---|---|---|---|---|---|---|

Prioritized UORA Procedure

| STA1 (Low Latency) | STA2 (Low Latency) | STA3 (Non-low latency) |
|---|---|---|
| Initial POBO = 5 | Initial POBO = 4 | Initial OBO = 4 |
| # of eligible RA-RUs = 5 | # of eligible RA-RUs = 5 | — |
| POBO <= 5: => POBO = 0 | POBO <= 5: => POBO = 0 | # of eligible RA-RUs = 3<br>OBO > 5: => OBO = 2 |
| STA1 wins UORA contention and randomly picks one RA-RU (from RU1 – RU5), e.g. RU1 for transmission in the TB PPDU. | STA2 wins UORA contention and randomly picks one RA-RU (from RU1 – RU5) e.g. RU3 for transmission in the TB PPDU. | STA3 does not win UORA contention. |

TF

RU 1
AID 0
RU 2
AID 0
RU 3
AID 0
RU 4
AID 0
RU 5
AID 0

STA1's L.L.

STA2's L.L.

AP       STAs

Normal RA-RU

Prioritized RA-RU

COMMUNICATION APPARATUS AND COMMUNICATION METHOD FOR PRIORITIZED TRAFFIC

TECHNICAL FIELD

The present disclosure relates to communication apparatuses and methods for prioritized traffic, more particularly low latency traffic, in EHT WLAN (extremely high throughput wireless local area network).

BACKGROUND

In the standardization of next generation wireless local area network (WLAN), a new radio access technology necessarily having backward compatibilities with IEEE 802.11a/b/g/n/ac/ax technologies has been discussed in the IEEE 802.11 Working Group and is named IEEE 802.11be Extremely High Throughput (EHT) WLAN.

In 802.11be EHT WLAN, in order to provide significant peak throughput and capacity increase beyond 802.11ax high efficiency (HE) WLAN, especially for cell-edge STAs, it has been proposed to enable better integrations for low-latency traffic.

However, there has been no much discussion on efficient procedure for prioritized traffic and low latency traffic.

There is thus a need for communication apparatuses and methods that provide feasible technical solutions for prioritized traffic in the context of EHT WLAN. Furthermore, other desirable features and characteristics will become apparent from the subsequent detailed description and the appended claims, taken in conjunction with the accompanying drawings and this background of the disclosure.

SUMMARY

Non-limiting and exemplary embodiments facilitate providing communication apparatuses and communication methods for prioritized traffic, more particularly low latency traffic in context of EHT WLAN.

In a first embodiment, the present disclosure provides a communication apparatus comprising: a receiver, which, in operation, receives from another communication apparatus a notification of one or more priority service periods (SPs), each SP being a time period in which only frames belonging to a traffic type designated by the other communication apparatus are allowed to be transmitted; and circuitry, which, in operation, determines if at least one frame of the designated traffic type is to be transmitted in one of the one or more SPs, and refrains from transmitting during the one of the one or more SPs in response to the determination that there are no frames of the designated traffic type to be transmitted.

In a second embodiment, the present disclosure provides a communication method performed by a communication apparatus comprising: receiving from another communication apparatus a notification of one or more priority service periods (SPs), each SP being a time period in which only frames belonging to a traffic type designated by the other communication apparatus are allowed to be transmitted; determining if at least one frame of the designated traffic type is to be transmitted in one of the one or more SPs; and refraining from transmitting during the one of the one of more SPs in response to the determination that there are no frames of the designated traffic type to be transmitted.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

Embodiments of the disclosure will be better understood and readily apparent to one of ordinary skilled in the art from the following written description, by way of example only, and in conjunction with the drawings, in which:

FIG. 3 shows a flow chart illustration a communication method for prioritized traffic according to various embodiments of the present disclosure.

FIG. 8 shows an example frame control field of the RTS frame and the CTS frame in FIGS. 7A and 7B.

FIG. 14 shows a prioritized Uplink OFDMA-based Random Access (UORA) procedure according to a fourth embodiment of the present disclosure.

Figure 1A:
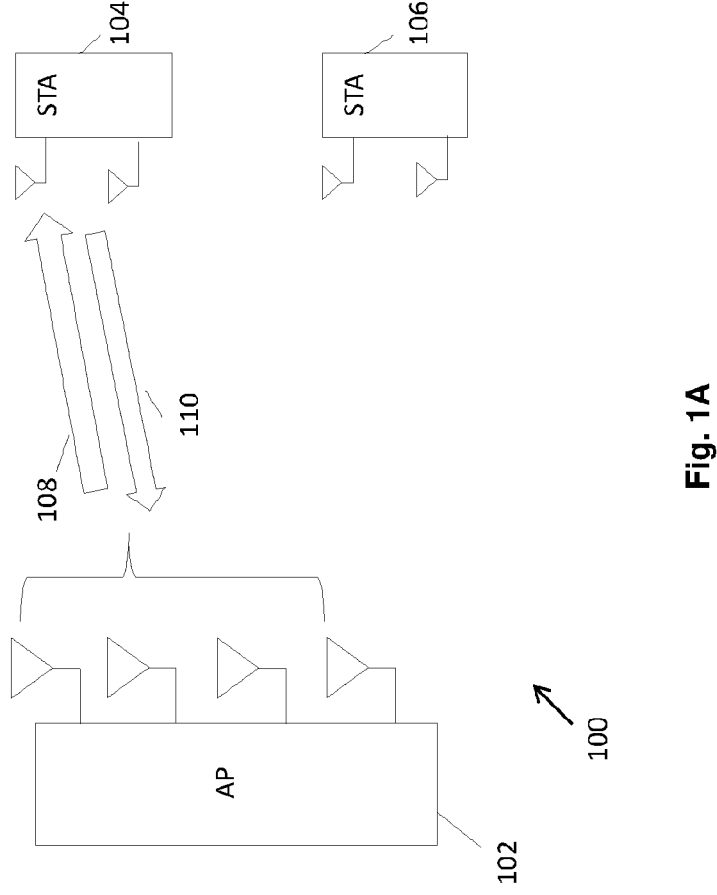
FIG. 1A depicts a schematic diagram of uplink and downlink single-user (SU) multiple input multiple output (MIMO) communication between an access point (AP) and a station (STA) in a MIMO wireless network.

Skilled artisans will appreciate that elements in the figures are illustrated for simplicity and clarity and have not necessarily been depicted to scale. For example, the dimensions of some of the elements in the illustrations, block diagrams or flowcharts may be exaggerated in respect to other elements to help an accurate understanding of the present embodiments.

DETAILED DESCRIPTION

Some embodiments of the present disclosure will be described, by way of example only, with reference to the drawings. Like reference numerals and characters in the drawings refer to like elements or equivalents.

In the following paragraphs, certain exemplifying embodiments are explained with reference to one or more access point (AP) and one or more station (STA) prioritized traffic, more particularly low latency traffic, in EHT WLAN.

In the context of IEEE 802.11 (Wi-Fi) technologies, a station, which is interchangeably referred to as a STA, is a communication apparatus that has the capability to use the 802.11 protocol. Based on the IEEE 802.11-2016 definition, a STA can be any device that contains an IEEE 802.11-conformant media access control (MAC) and physical layer (PHY) interface to the wireless medium (WM).

For example, a STA may be a laptop, a desktop personal computer (PC), a personal digital assistant (PDA), an access point or a Wi-Fi phone in a wireless local area network (WLAN) environment. The STA may be fixed or mobile. In the WLAN environment, the terms "STA", "wireless client", "user", "user device", and "node" are often used interchangeably.

Likewise, an AP, which may be interchangeably referred to as a wireless access point (WAP) in the context of IEEE 802.11 (Wi-Fi) technologies, is a communication apparatus that allows STAs in a WLAN to connect to a wired network. The AP usually connects to a router (via a wired network) as a standalone device, but it can also be integrated with or employed in the router.

As mentioned above, a STA in a WLAN may work as an AP at a different occasion, and vice versa. This is because communication apparatuses in the context of IEEE 802.11 (Wi-Fi) technologies may include both STA hardware components and AP hardware components. In this manner, the communication apparatuses may switch between a STA mode and an AP mode, based on actual WLAN conditions and/or requirements. In various embodiments below, a non-AP STA may refer to a STA in a WLAN that is not implemented as an AP.

In a MIMO wireless network, "multiple" refers to multiple antennas used simultaneously for transmission and multiple antennas used simultaneously for reception, over a radio channel. In this regard, "multiple-input" refers to multiple transmitter antennas, which input a radio signal into the channel, and "multiple-output" refers to multiple receiver antennas, which receive the radio signal from the channel and into the receiver. For example, in an N×M MIMO network system, N is the number of transmitter antennas, M is the number of receiver antennas, and N may or may not be equal to M. For the sake of simplicity, the respective numbers of transmitter antennas and receiver antennas are not discussed further in the present disclosure.

In a MIMO wireless network, single-user (SU) communications and multi-user (MU) communications can be deployed for communications between communication apparatuses such as APs and STAs. MIMO wireless network has benefits like spatial multiplexing and spatial diversity, which enable higher data rates and robustness through the use of multiple spatial streams. According to various embodiments, the term "spatial stream" may be used interchangeably with the term "space-time stream" (or STS).

FIG. 1A depicts a schematic diagram of SU communication 100 between an AP 102 and a STA 104 in a MIMO wireless network. As shown, the MIMO wireless network may include one or more STAs (e.g. STA 104, STA 106, etc.). If the SU communication 100 in a channel is carried out over whole channel bandwidth, it is called full bandwidth SU communication. If the SU communication 100 in a channel is carried out over a part of the channel bandwidth (e.g. one or more 20 MHz subchannels within the channel is punctured), it is called punctured SU communication. In the SU communication 100, the AP 102 transmits multiple space-time streams using multiple antennas (e.g. four antennas as shown in FIG. 1A) with all the space-time streams directed to a single communication apparatus, i.e. the STA 104. For the sake of simplicity, the multiple space-time streams directed to the STA 104 are illustrated as a grouped data transmission arrow 108 directed to the STA 104.

The SU communication 100 can be configured for bi-directional transmissions. As shown in FIG. 1A, in the SU communication 100, the STA 104 may transmit multiple space-time streams using multiple antennas (e.g. two antennas as shown in FIG. 1A) with all the space-time streams directed to the AP 102. For the sake of simplicity, the multiple space-time streams directed to the AP 102 are illustrated as a grouped data transmission arrow 110 directed to the AP 102.

As such, the SU communication 100 depicted in FIG. 1A enables both uplink and downlink SU transmissions in a MIMO wireless network.

Figure 1B:
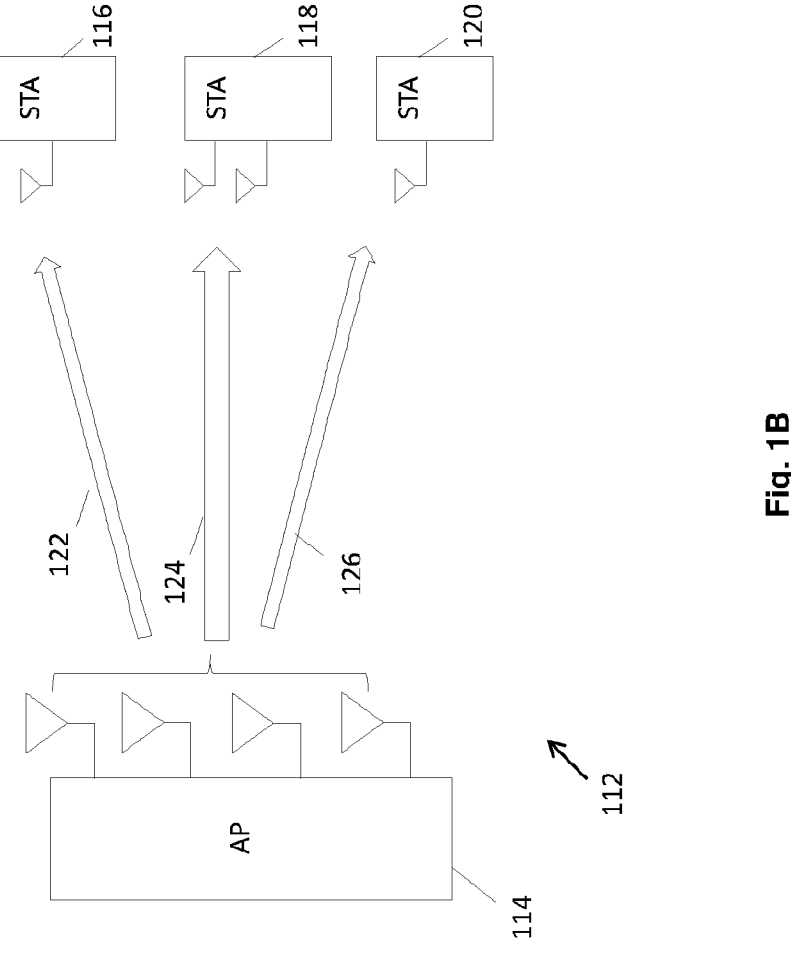
FIG. 1B depicts a schematic diagram of downlink multi-user (MU) communication between an AP and multiple STAs in a MIMO wireless network.

FIG. 1B depicts a schematic diagram of downlink MU communication 112 between an AP 114 and multiple STAs 116, 118, 120 in a MIMO wireless network. The MIMO wireless network may include one or more STAs (e.g. STA 116, STA 118, STA 120, etc.). The MU communication 112 can be an OFDMA (orthogonal frequency division multiple access) communications or a MU-MIMO communication. For an OFDMA communication in a channel, the AP 114 transmits multiple streams simultaneously to the STAs 116, 118, 120 in the network at different resource units (RUs) within the channel bandwidth. For a MU-MIMO communication in a channel, the AP 114 transmits multiple streams simultaneously to the STAs 116, 118, 120 at same RU(s) within the channel bandwidth using multiple antennas via spatial mapping or precoding techniques. If the RU(s) at which the OFDMA or MU-MIMO communication occurs occupy whole channel bandwidth, the OFDMA or MU-MIMO communications is called full bandwidth OFDMA or MU-MIMO communications. If the RU(s) at which the OFDMA or MU-MIMO communication occurs occupy a part of channel bandwidth (e.g. one or more 20 MHz subchannel within the channel is punctured), the OFDMA or MU-MIMO communication is called punctured OFDMA or MU-MIMO communications. For example, two space-time streams may be directed to the STA 118, another space-time stream may be directed to the STA 116, and yet another space-time stream may be directed to the STA 120. For the sake of simplicity, the two space-time streams directed to the STA 118 are illustrated as a grouped data transmission arrow 124, the space-time stream directed to the STA 116 is illustrated as a data transmission arrow 122, and the space-time stream directed to the STA 120 is illustrated as a data transmission arrow 126.

Figure 10:
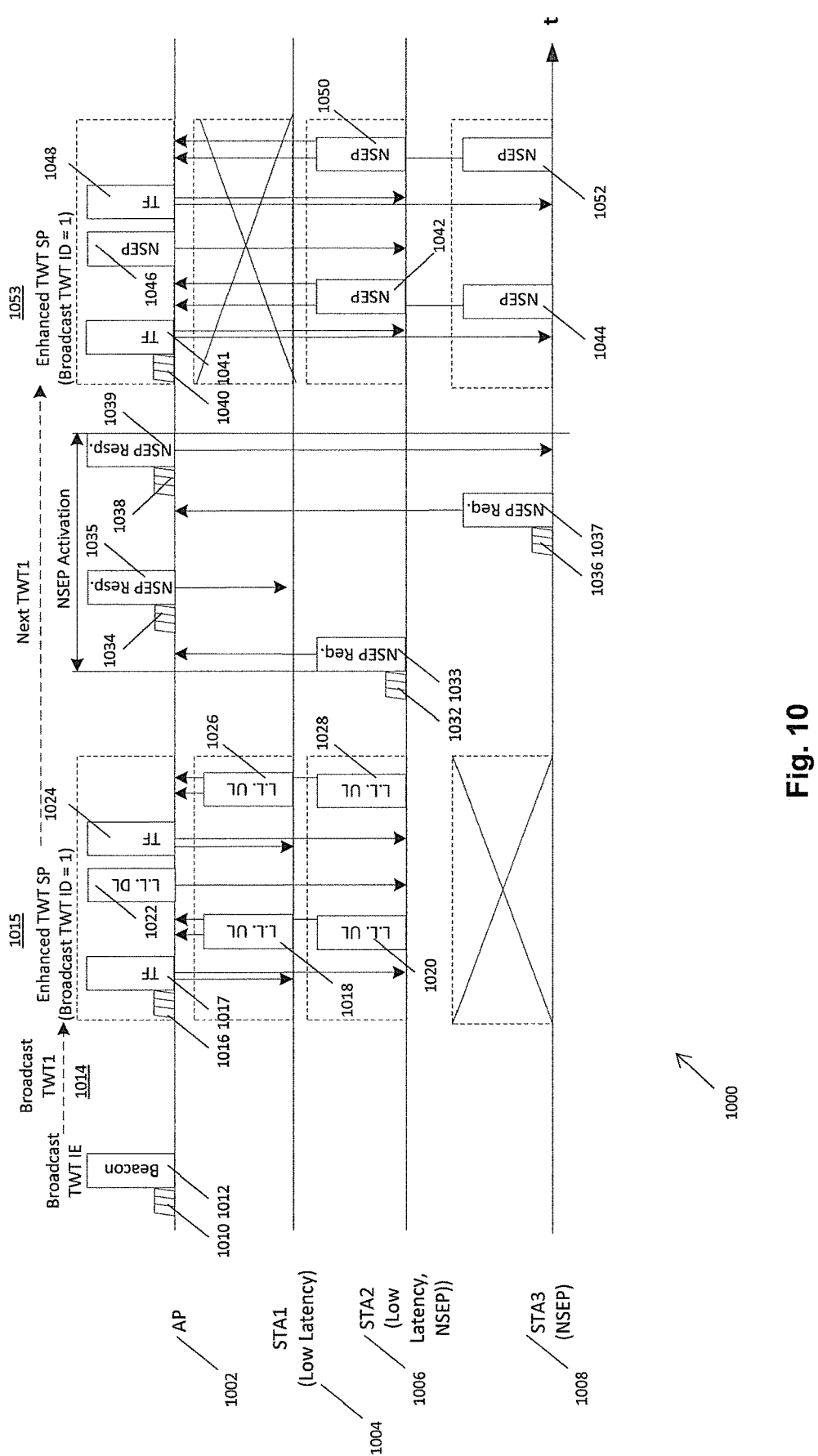
FIG. 10 shows a flow diagram illustrating communication for prioritized traffic according to a second embodiment of the present disclosure.

To enable uplink MU transmissions, trigger-based communication is provided to the MIMO wireless network. In this regard, FIG. 10 depicts a schematic diagram of trigger-based uplink MU communication 128 between an AP 130 and multiple STAs 132, 134, 136 in a MIMO wireless network.

Since there are multiple STAs 132, 134, 136 participating in the trigger-based uplink MU communication, the AP 130 needs to coordinate simultaneous transmissions of multiple STAs 132, 134, 136.

Figure 1C:
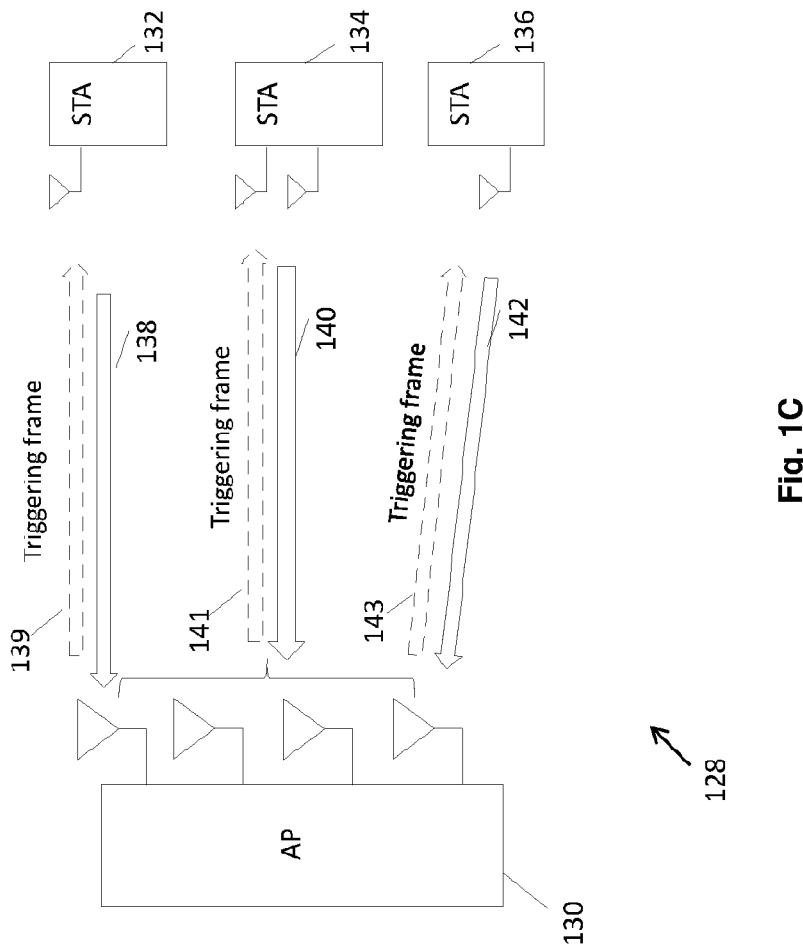
FIG. 1C depicts a schematic diagram of trigger-based uplink MU communication between an AP and multiple STAs in a MIMO wireless network.

To do so, as shown in FIG. 1C, the AP 130 transmits triggering frames 139, 141, 143 simultaneously to STAs 132, 134, 136 to indicate user-specific resource allocation information (e.g. the number of space-time streams, a starting STS number and the allocated RUs) each STA can use. In response to the triggering frames, STAs 132, 134, 136 may then transmit their respective space-time streams simultaneously to the AP 130 according to the user-specific resource allocation information indicated in the triggering frames 139, 141, 143. For example, two space-time streams may be directed to the AP 130 from STA 134, another space-time stream may be directed to the AP 130 from STA 132, and yet another space-time stream may be directed to the AP 130 from STA 136. For the sake of simplicity, the two space-time streams directed to the AP 130 from STA 134 are illustrated as a grouped data transmission arrow 140, the space-time stream directed to the AP 130 from STA 132 is illustrated as a data transmission arrow 138, and the space-time stream directed to the AP 130 from STA 136 is illustrated as a data transmission arrow 142.

Due to packet/PPDU (physical layer protocol data unit) based transmission and distributed MAC (medium access control) scheme in 802.11 WLAN, time scheduling (e.g. TDMA (time division multiple access)-like periodic time slot assignment for data transmission) does not exist in 802.11 WLAN. Frequency and spatial resource scheduling is performed on a packet basis. In other words, resource allocation information is on a PPDU basis.

According to various embodiments, EHT WLAN supports non-trigger-based communications as illustrated in FIG. 1A and FIG. 1B and trigger-based communications as illustrated in FIG. 1C. In non-trigger-based communications, a communication apparatus transmits a PPDU to one other communication apparatus or more than one other communication apparatuses in an unsolicited manner. In trigger-based communications, a communication apparatus transmits a PPDU to one other communication apparatus or more than one other communication apparatuses only after a soliciting triggering frame is received.

There are three main latency regions (categories) are identified for low latency applications: (a) 10-50 milliseconds (ms) for applications such as interactive video and automated vehicles; (b) 1-10 ms for applications such as augment reality/visual reality (AR/VR) and gaming; and (c) 1 ms or less for TSN-like (time-sensitive-network-like) applications. Among other method, it is proposed to enhance TWT mechanism for latency sensitive traffic; this may be especially beneficial in deployments with few or no legacy 802.11 devices e.g. in the 6 GHz band.

In United States, Department of Homeland Security/Emergency Communications Division (DHS/ECD) priority telecommunications programs provide national security and emergency preparedness (NSEP) and public safety users the ability to communicate on public telecommunications networks during times of congestion, for example, in times of disaster and emergencies such as floods, earthquakes, hurricanes, terrorist attacks. NSEP traffic is another potential beneficiary of the current disclosure.

In particular, NSEP priority access provides prioritized access to system resources for authorized users to increase their probability of successful communication during periods of network congestion. Priority access involves preferential treatment in obtaining channel access and in allocation of network resources. The service is only available to designated, authorized devices who normally represent a small fraction of the overall number of devices operating in the area.

The non-AP STA requests NSEP priority access by sending a request to the AP. The AP confirms the authority of the non-AP STA to use NSEP priority access, for example, using the locally stored verification information or reaching out to NSEP service provider via the SSPN interface, and sending a response to the requesting non-AP STA.

Target wait time (TWT) was original introduced in 802.11ah and enhanced by 802.11ax. With the TWT mechanism, STAs can agree with the AP on a common wake scheduling, allowing them to wake up only when required. Its main purpose is to minimize contention among STAs within the basic service set (BSS) and reduce power save STA's awake period. The TWT Session Period (SP) is the time period in which a STA is awake to receive or transmit data.

TWT Agreement is the final arrangement between the AP and the STA, reached after negotiation, to define the details of the TWT SP(s) the STA will belong to, for example, the time(s) the station has to wake up. One TWT agreement allows the STA to participate in multiple TWT SPs which wake up periodically. A TWT agreement may allow DL, UP or both type of transmission, according to the negotiation and to further instructions that the AP can provide at the beginning of each TWT SP, for example, through a Trigger frame.

TWT mechanism includes Individual TWT and Broadcast TWT which can be implemented Individual TWT agreement and Broadcast TWT agreement between AP and STA(s) respectively.

Figure 2A:
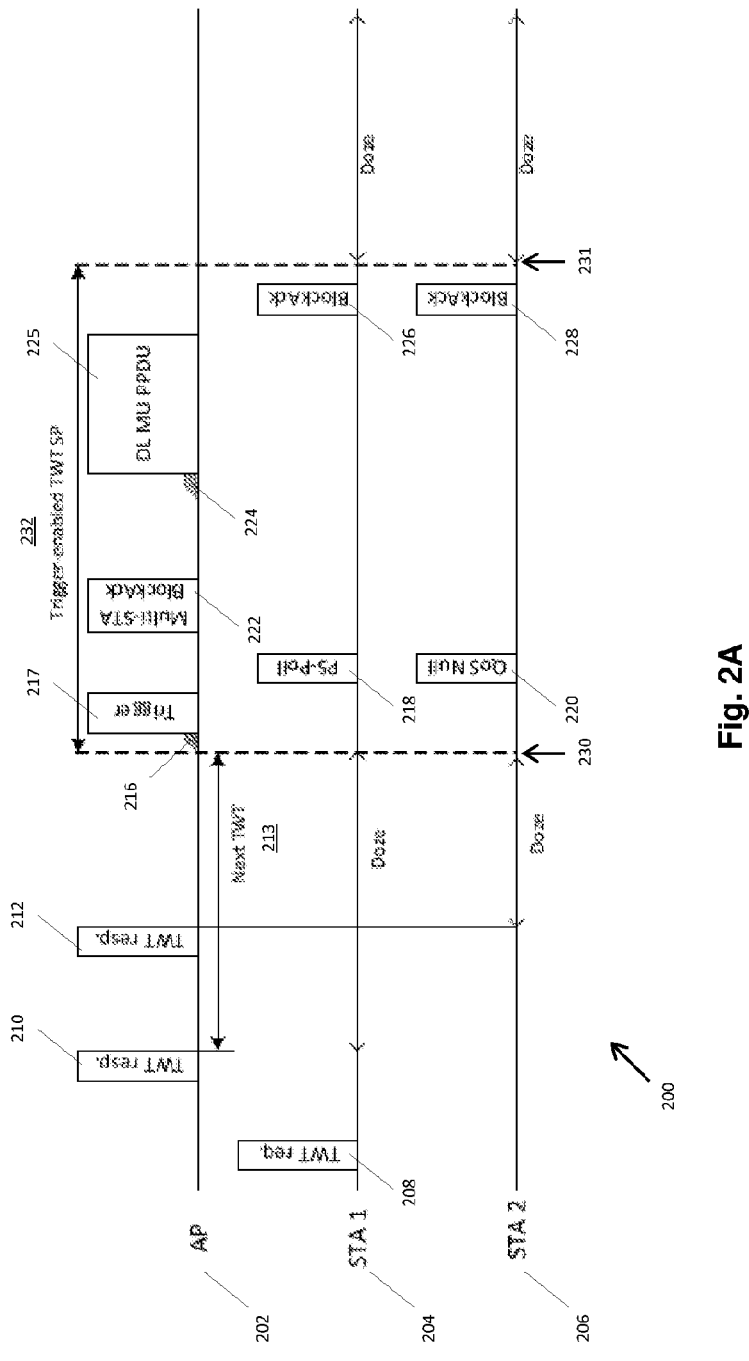
FIG. 2A shows a flow diagram illustrating Individual TWT-based communications between an AP 202 and two STAs.

FIG. 2A shows a flow diagram 200 illustrating Individual TWT-based communications between an AP 202 and two STAs (STA 1 204, STA 2 206). To initiate a TWT session, first there is a negotiation phase in which an AP and a STA (e.g. STA 1 204) agree on a common set of parameters such as:

Target Wake Time (TWT): the next time (e.g. Next TWT 213) in microseconds at which the station participating in the TWT-based communication should wake up for the TWT SP.

TWT Wake Interval: the time interval between subsequent TWT sessions for the station; the value is higher than 0 when the TWT is periodic.

Minimum TWT Wake Duration: the minimum time duration a station shall stay awake since the starting time of the TWT SP so as to be able to receive frames from the other stations(s).

TWT Channel: the channel a station can use temporarily as the primary one.

TWT Protection: the mechanism employed to protect a TWT SP from transmission of external stations, such as Request To Send (RTS)/Clear to Send (CTS).

During the negotiation phase, the following aspects are also defined. First, the TWT agreement can be:

Explicit, which requires TWT parameters to be advertised before each new session or SP; or Implicit, which allows the parameters for periodic sessions or subsequent TWT SPs to be calculated implicitly relying on the first TWT SP or the first set of parameters until a new set is received.

Further, different TWT operation inside a TWT SP may exist:

Trigger-enabled: The AP sends a Trigger frame (e.g. Trigger frame 217) during the TWT SP (e.g. Trigger-enabled TWT SP 232) to schedule stations' transmission.

Non Trigger-enabled: when the use of Trigger frames is not required, thus allowing each station to decide when to transmit autonomously inside the TWT session.

Protected: a TWT SP starts with Request To Send (RTS)/Clear To Send (CTS) exchange.

Announced: the STA is required to send messages to announce its presence in order to retrieve the downlink (DL) buffered data at the AP.

Unannounced: the AP may transmit DL traffic to STAs that are active within the targeted wake times without waiting any previous frame the STAs, assuming that STAs from a TWT TP must be awake to awake at the start of the TWT SP.

Returning to FIG. 2A, to create a new TWT TP, STA 1 204 may generate and transmit a TWT request frame 208 to AP 202. The TWT request frame comprises a request for a TWT SP and specifies a set of parameters for the TWT SP. The request frame type is one of the following:

Suggest: the set of parameters' values included in the request are those that STA 1 204 is willing to use, but it will consider accepting an alternative set.

Request: STA 1 204 is willing to set a TWT agreement and lets the responding station specify the TWT parameters' set.

Demand: STA 1 204 wants to set a TWT agreement but will not accept a set of parameters different than the one specified in the TWT request frame 208.

AP may respond to the TWT request frame 208 by transmitting a TWT response frame 210 to STA 1 204. The TWT response frame 210 may also specify a set of parameters for the TWT SP. The response frame type may be one of the following:

Accept: AP 210 accepts the request and the TWT agreement is set up with the parameters' value specific in the TWT response frame 210.

Alternate: AP 210 proposes an alternative set of parameters' values. Another pair of request frame and response frame may be needed to conclude the agreement negotiation phase.

Dictate: AP 210 demands another set of parameters with no possibility for further negotiating them. Another pair of request frame and response frame may be needed to conclude the agreement negotiation phase.

Reject: the TWT SP is not accepted.

Returning to FIG. 2A, the response frame type of the TWT response frame 210 is Accept, a TWT agreement has then been setup between AP 202 and STA 1 204, and STA 1 204 may go to sleep until the next TWT TP starts at 230.

The AP can have multiple TWT agreements, each one with a different station, but some of them may overlap in time. Another STA may be scheduled by the AP for simultaneous transmission, or have to contend for the medium through random access. In addition, the TWT grouping mechanism allows the AP to specify a Time-division multiple access-like (TDMA-like) scheduling from the start time of the common TWT SP by providing a transmission time for each group and for each station within the group. In this case, AP 202 transmits another TWT response frame 212 to provide a transmission time and a set of parameters for the TWT SP 232 to STA 2 206 within the BSS to schedule STA 2 206 for simultaneous transmission in the TWT SP 232. Similarly, a TWT agreement has then been setup between AP 202 and STA 2 206, and STA 2 206 may go to sleep (doze) until the next TWT TP starts at 230.

Contention based channel access procedures, e.g. enhanced distributed channel access (EDCA) procedures, are illustrated by blocks 216, 224. At the beginning of TWT SP 232 at 230, after both STA 1 204 and STA 2 206 wake up, AP 202 may transmit a Trigger frame 217 to enable STAs' transmissions during the trigger-based TWT SP 232. Upon receipt of the Trigger frame 217, STA 1 204 may generate and transmit a PS(power saving)-Poll frame 218 to request pending frames buffered at AP 202; whereas STA 2 206 may simultaneously generate and transmit a QoS (quality of service) Null frame 220 carrying empty data frame and does not request data from AP 202. AP 202 after receives the PS-Poll frame 218 and the QoS Null frame 220 may then transmit a Multi-STA BlockAck frame 222 to STA 1 204 and STA 2 206.

Subsequently, AP 202 may transmit a DL MU PPDU 225 to STA 1 204 and STA 2 206. The DL MU PPDU 225 may contain the pending frames and buffered data requested by STA 1 204. Upon receipt of the DL MU PPDU 225, STA 1 204 and STA 2 206 may generate and transmit respective BlockAck frames 226, 228 to AP 202. Next, once the Trigger-enabled TWT SP 232 has ended at 231, STA 1 204 and STA 2 206 may go to sleep (doze).

Figure 2B:
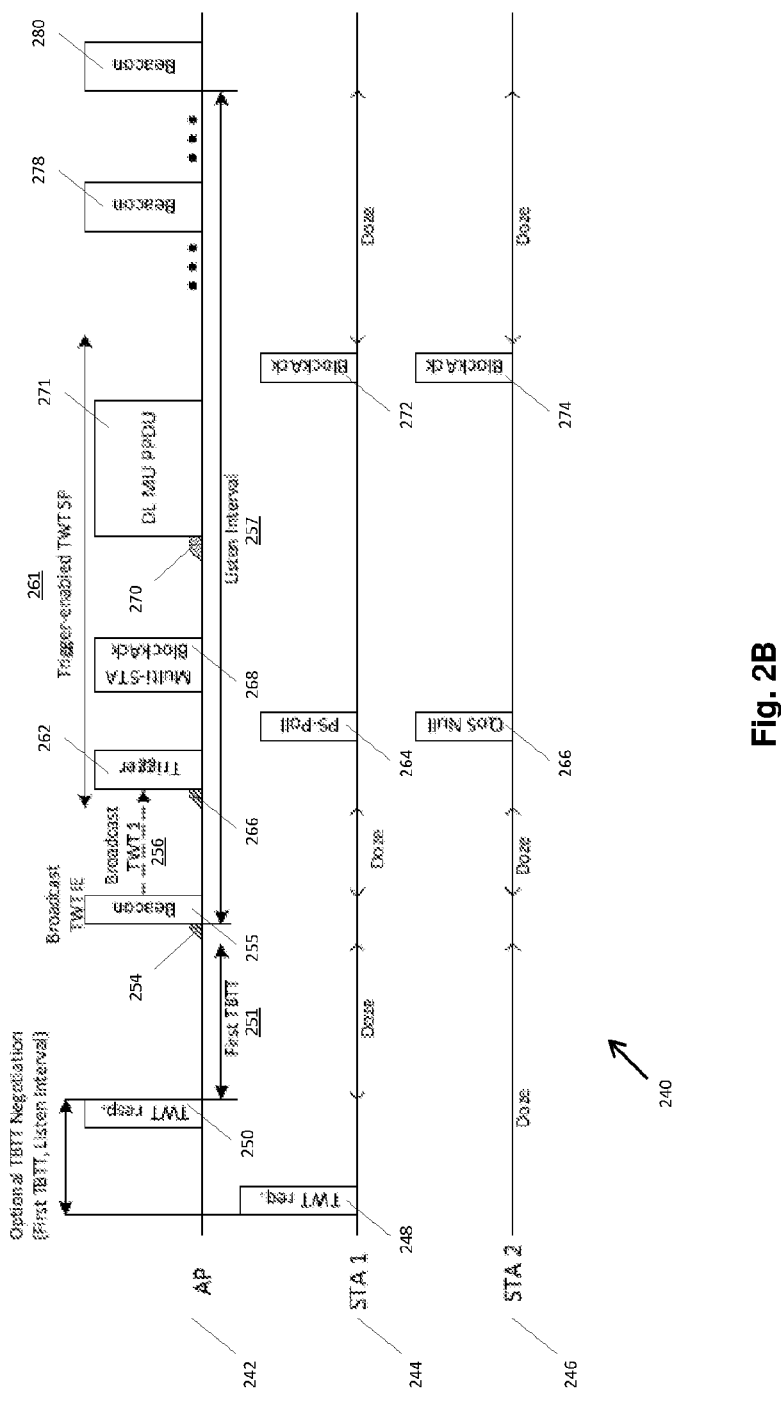
FIG. 2B shows a flow diagram illustrating Broadcast TWT-based communications between an AP 202 and two STAs.

FIG. 2B shows a flow diagram 240 illustrating Broadcast TWT-based communications between an AP 242 and two STAs (STA 1 244, STA 2 246). Broadcast TWT operation allows AP 242 to set up a shared TWT session for a group of STAs (e.g. STA 1 244, STA 2 246) and specify periodically a set of TWT parameters within Beacon frames (e.g. Beacon frame 255). The STAs (e.g. STA 1 244, STA 2 246) of a TWT Broadcast agreement are required to wake up to receive only the Beacon frames containing instructions for the TWT Broadcast sessions (e.g. Trigger-enabled TWT SP 261) they belong to. Note that AP 242 may advertise existing TWT Broadcast agreements so that stations may request membership in existing TWT session, or send requests to create new ones.

In order to request for participation in a Broadcast TWT agreement, STA 1 244 may generate and transmit a TWT request frame 248 to AP 242. Such a request can transmitted in response to a participation request solicited by AP 242 to all the associated stations that support TWT within the BSS. Similar to Individual TWT agreement, in the negotiation phase, STA 1 244 can request, suggest or demand a set of parameters of the Broadcast TWT SP (e.g. Trigger-enabled TWT SP 261), while the AP may then respond by transmit a TWT response frame 250 to accept or reject the request or proposed an alternative set of parameters. In most cases, the TWT parameters are decided by AP 242.

During the agreement setup phase, STA 1 244 may optimally negotiate other two fundamental parameters:

Next target beacon transmission time: the next transmission time of a Beacon frame including TWT information relevant for STA 1 244, i.e. related to the Broadcast TWT SP STA 1 belongs to (e.g. Trigger-enabled TWT SP 261). In this case, a first target beacon transmission time (first TBTT 251) of the Beacon frame 255 is negotiated during the setup phase.

Listen Interval: interval (e.g. Listen Interval 257) between subsequent beacons (e.g. Beacon frame 280) carrying TWT information relevant for the STA 1 244.

Subsequently, the STA goes to doze state and wakes up at the time at which the next relevant Beacon is scheduled. In this case, STA 1 244 wakes up after the first TBTT 251 when the first Beacon frame 254 is scheduled. STA 2 246 may also belong to the TWT SP 261 and hence wake up to receive the Beacon frame 254. The Beacon frame 254 may carry the information about the Broadcast TWT session that allows involved STAs like STA 1 244 and STA 2 246 to follow the session schedule. The information may comprise Broadcast TWT 256, that is, a time at which the involved STAs like STA 1 244 and STA 2 246 should wake up for the Broadcast TWT SP; TWT Wake Interval, Minimum TWT Wake Duration (e.g. Triggered-enabled TWT SP 261). Upon receipt of the Beacon frame 254, STA 1 204, and STA 1 204 may go to sleep until the Broadcast TWT TP starts.

Contention based channel access procedures, e.g. enhanced distributed channel access (EDCA) procedures, are illustrated by blocks 266, 270. At the beginning of TWT SP 261, after both STA 1 244 and STA 2 246 wake up, AP 242 may transmit a Trigger frame 262 to enable STAs' transmissions during the trigger-based TWT SP 261. Upon receipt of the Trigger frame 266, STA 1 244 may generate and transmit a PS-Poll frame 264 to request pending frames buffered at AP 242; whereas STA 2 246 may simultaneously generate and transmit a QoS Null frame 266 carrying empty data frame and does not request data from AP 242. AP 242 after receives the PS-Poll frame 264 and the QoS Null frame 266 may then transmit a Multi-STA BlockAck frame 268 to STA 1 244 and STA 2 246.

Subsequently, AP 242 may transmit a DL MU PPDU 271 to STA 1 244 and STA 2 246. The DL MU PPDU 271 may contain the pending frames and buffered data requested by STA 1 244. Upon receipt of the DL MU PPDU 271, STA 1 244 and STA 2 246 may generate and transmit respective BlockAck frames 272, 274 to AP 242. Next, once the Trigger-enabled TWT SP 232 has ended, STA 1 244 and STA 2 246 may go to sleep (doze) until the next TWT SP starts.

In addition, AP 242 may also broadcast any update on the TWT parameters' set of the TWT SP using another Beacon frame 278 so that STA 1 244 and STA 2 246 can properly update it.

Details of a TWT agreement for TWT modes and parameters can be carried in a TWT Element which can be included in a TWT request/response frame exchanged between AP and STA for the negotiation and TWT setup process. A TWT request/response frame (e.g. TWT request 208, 248, and a TWT response frame 210, 212, 250) may comprise a set of parameters for TWT agreement setup such as TWT and TWT Wake Interval for individual TWT, and next target beacon (e.g. first TBTT) and listen interval for broadcast TWT; and a signal field specifying the operation modes of the TWT SP on whether the TWT parameters is explicitly advertised or implicitly calculated based on the first SP, whether the TWT SP is triggered-enabled using a Trigger frame or not, and whether a STA is required to announce its presence to retrieve buffered data at the AP.

The TWT Element comprised in a TWT request/response frame may also comprise a broadcast TWT ID which is used to identify a Broadcast TWT agreement. The value 0 in the Broadcast TWT ID subfield of the TWT Element indicates the broadcast TWT whose membership corresponds to all STAs that are members of the BSS corresponding to the BSSID of the Management frame carrying the TWT element and that is permitted to contain Trigger frames with RA-RUs (Random Access Resource Units) for unassociated STAs; whereas the value 1 indicates a negotiation with a STA is necessary.

Further, a Broadcast TWT Recommendation field of a TWT Element may indicate constraints on frames transmitted during a broadcast TWT SP. Table 1 summarizes the constraints on frames transmitted during a broadcast TWT SP.

TABLE 1

Various constraints on frames transmitted during a broadcast TWT SP corresponding to Broadcast TWT Recommendation field value

| Broadcast TWT Recommendation field value | Description when transmitted in a broadcast TWT element |
| --- | --- |
| 0 | No constraints on the frame transmitted during a broadcast TWT SP |
| 1 | Frames transmitted during a broadcast TWT SP are recommended to be limited to solicited status and solicited feedback: PS-Poll and QoS Null frames BQRS, BSRs, Control Response frames, Frames that are sent as part of a sounding feedback exchange (see 26.7 (HE sounding protocol)) Management frames: Action or Action No Ack frames Control response frames Trigger frames without RA RU. |
| 2 | Same as 1 except Trigger frame contains at least one RA RU |
| 3 | No constraints except that the AP transmits a traffic indication map (TIM) frame or a Fast Initial Link Setup (FILS) Discovery frame including a TIM element at the beginning of each TWT SP. |

It is noted that in 802.11ax specification, the recommendation provided in the Broadcast TWT Recommendation field are only recommendations, that is, a TWT scheduled STA should not send frames that do not satisfy the Broadcast TWT Recommendation subfield recommendations in Table 9-299a (Broadcast TWT Recommendation field for a broadcast TWT element) during the corresponding TWT SP(s).

There is no discussion on how to ensure that prioritized traffic (e.g. low latency traffic) can gain access to the medium during the assigned TWT SP with a high probability. To ensure that the TWT mechanism can be used effectively for low latency traffic, the following needs to be addressed:

1. Signaling mechanism to restrict channel access (from non-designated traffic) within Enhanced TWTs (e.g. based on traffic identifier (TID)/access category (AC).

2. Protection of the Enhanced TWT SPs from legacy STAs (especially, TWT is optional for 11ax and not understood by 11n/11ac).

It is an object to of present disclosure to substantially overcome the existing challenges to provide communication apparatuses and methods for prioritized traffic, more particularly low latency traffic, in EHT WLAN. According to the present disclosure, it is assumed that AP has means to achieve signalling mechanism for AP(s) to gather the priority traffic (e.g. low latency, NSEP) characteristic/needs of non-AP STAs (e.g. with modified Traffic Specification (TSPEC)/Traffic stream (TS).

FIG. 3 shows a flow chart 300 illustrating a communication method for prioritizing traffic according to various embodiments of the present disclosure. In step 302, a step of receiving from another communication apparatus a notification of one or more priority service periods (SPs) is carried out. Each SP is a time period in which only frames belonging to a traffic type designated by the other communication apparatus are allowed to be transmitted. In step 304, a step of determining if at least one frame of the designated traffic type is to be transmitted in one of the one or more SPs is carried out. In step 306, a step of refraining from transmitting during the one of the one or more SPs is carried out in response to the determination that there are no frames of the designated traffic type to be transmitted.

According to the present disclosure, mechanisms are proposed to allow only designated traffic to be transmitted within pre-allocated time/frequency resources. In various embodiments of the present disclosure, such pre-allocated time/frequency resources refer to a Priority Service Period (SP)). In other words, transmissions from non-designated traffics of non-AP STAs are restricted (not allowed) within the Priority Service Periods.

For example, a non-AP STA may comprise a receive which receives from an AP a notification of one (or more) Priority SP, the Priority SP being a time period in which only frames belonging to a traffic type designated by the AP are allowed to be transmitted; and circuitry which is configured to determine if at least one frame of the traffic type designated by the AP is to be transmitted in the Priority SPs, and in response to the determining that there are no frames of the designated traffic is to be transmitted in the Priority SP, the circuitry may be further configured to refrain the non-AP STA from transmitting during the Priority SP.

Under such mechanism, APs advertises existence of Priority SPs in broadcast frame (e.g. Beacon frames), and only frames belonging to the designated traffic (e.g. low latency traffic) and related frames (e.g. Trigger frame, ACKs, Block-Acks (BAs) etc.) are allowed to be transmitted in the Priority SPs. Further restriction includes allowing only frames by STAs that have negotiated membership for the Priority SPs to be transmitted during the enhanced Priority SPs.

In an embodiment, a STA can negotiate membership for one (or more) Priority SP by sending a request to the AP soliciting the membership for the Priority SP, where circuitry of the STA may be configured to generate to an AP a request signal specifying a set of parameters for the Priority SP such as minimum wake up duration, wake interval, target wake time and channel, and a receiver of the STA may then receive a response signal from the AP either accepting or rejecting the request or proposes an alternative set of parameters. When the response signal indicates an acceptance of the set of parameters, the circuitry of the STA may be further configured to determine that it is associated with the Priority SP and set up itself with the set of parameters for transmission during the Priority SP.

In another embodiment, a STA can negotiate membership for one (or more) Priority by receiving a participation request to the Priority SP solicited by the AP, where a receiver of the STA may receive from the AP a request signal specifying a set of parameters for the Priority SPs such as minimum wake up duration, wake interval, target wake time and channel, and circuitry of the STA may be configured to generate a response signal indicating an acceptance of the set of parameters. The circuitry of the STA may be further configured to determine that it is associated with the Priority SP and set up itself with the set of parameters for transmission during the Priority SP.

In various embodiments below, when a STA is associated with a Priority SP(s), it signifies that the STA has successfully negotiated with the AP and is granted membership for the Priority SP(s) by the AP, and is a member of the Priority SP(s).

Upon successful negotiation, non-AP STAs that are granted membership to the Priority SPs by the AP are allowed to transmit frames belonging to the designated traffic (e.g. low latency traffic) and related frames (Trigger frame, ACKs, BAs etc.) in the Priority SPs. All non-AP STAs of the BSS are expected to be aware of all the Priority SPs supported by the associated AP and refrain themselves from attempting to transmit during any of the Priority SPs in which they are not a member, or if they do not have designated traffic to transmit (even if they are a member of the SP). Advantageously, this will improve channel access probability for designated traffic within a BSS.

Further, according to the present disclosure, mechanisms are proposed to restrict channel access (especially from pre-EHT (extremely high throughput) legacy STAs). According to the present disclosure, the receiver of the STA may further receive from the AP during the Priority SP a legacy frame carrying a network allocation vector (NAV) exclusion field, and the circuitry is further configured to, in response to determining that the STA is associated with the Priority SP (a member of the Priority SP), refrain from setting the NAV of the STA regardless of whether the legacy frame is addressed to the STA.

In various embodiments below, $EHT_+$ STA refers to future generation 802.11 devices, i.e. after EHT or 0.11be). Non-AP STAs may also choose to stay in doze mode during the entire Priority SPs in which they are not a member if they are operating in power save mode.

In other words, at the start of the Priority SP, the AP may transmit a NAV setting (modified) legacy frame (e.g. RTS and/or CTS frames) that carry special signal (e.g. one bit) to indicate to an EHT (or $EHT_+$) STA that, when received within an Priority SP in which the STA is a member, it should not set its NAV even if the STA is not addressed by the legacy frame. It is appreciable that any NAV setting legacy frame may be used (RTS/CTS being the most common example). For example, if enhanced QTP (Quiet Time Period) is used as the Priority Service Period, the Quiet Time Period Setup frame may be used as the NAV setting legacy frame, with a bit signalling to STAs that have negotiated the QTP as being exempt from setting NAV.

$EHT/EHT_+$ non-AP STAs that receive the modified frames within an Priority SP, in which the STA is a member, does not set its NAV even if the STA is not addressed by the frame, and is allowed to transmit designated traffic via any available access mechanism (e.g. EDCA, Triggered Uplink Access (TUA), UL OFDMA (orthogonal frequency division multiple access)-based Random Access (UORA) etc.). Advantageously, Priority SP is protected from legacy STAs.

In addition, UORA is customized as "Prioritized UORA" to provide prioritized channel access to designated traffic of non-periodic nature. According to the present disclosure, the receiver of the STA may receive from the AP a normal OFDMA Contention Window (OCW) range for a normal UORA and a prioritized OCW range; and the circuitry of the STA may be further configured to compute parameters of a prioritized UORA based on the received prioritized OCW range; and the receiver further receives one or more Trigger frames, each of the one or more Trigger frames allocating one or more RA-RUs and specifying the designated traffic type that are allowed to be transmitted in a response frame of the STA. Advantageously, non-periodic traffic can be given priority even outside a Priority SP.

To illustrate the present disclosure, enhanced Target Wake Time (TWT) is used as the Priority Service Period (SP) in various embodiments below. It is appreciable that other specific time or set of times defined by an AP that permits a STA(s) to access and communication with the AP may also be used. Various existing 802.11 mechanisms/protocols may be enhanced to function as the Priority SP, e.g. TWT, QTP (Quiet Time Period), S-APSD (Scheduled Automatic Power Save Delivery) or Restricted Access Window (RAW). It is also possible that a new protocol may be defined for Priority traffic. For example, the Quiet Time Period protocol which is used in 802.11ax to setup Quiet Period for communication between a pair of STAs in a peer-to-peer fashion, may be enhanced to the case of communication between multiple STAs e.g. between an AP and multiple associated STAs.

In the following paragraphs, a first embodiment of the present disclosure which relates to Enhanced TWT, restrictions, legacy protection and TWT parameter update is explained with reference to APs and STAs for prioritized traffic.

According to a first embodiment of the present disclosure, mechanism to restrict the channel access (from non-designated traffic) within Enhanced TWTs (for EHT and EHT$_+$ STAs in the same BSS). Under such mechanism, an AP advertises existence of Enhanced TWT SPs in broadcast frames (e.g. Beacon frames). Only frames belonging to the designated traffic (e.g. low latency or NSEP traffic) and related frames (e.g. Trigger frame, ACKs, BAs etc.) are allowed to be transmitted in the Enhanced TWT SPs. Further transmission restriction includes allowing only frames by STAs that have negotiated membership for the Enhanced TWT SPs to be transmitted during the Enhanced TWT SPs.

Similarly, non-AP STAs may negotiate membership to the Enhanced TWTs with the AP through exchange of TWT request/response frame. Upon successful negotiation, non-STAs that are granted membership to the Enhanced TWT SPs by the AP are associated with the TWT SPs, and are allowed to transmit frames belonging to the designated traffic (e.g. low latency traffic) and related frame (Trigger frame, ACKs, Bas etc.) in the Enhanced TWT SPs.

Since the information regarding the enhanced TWT SPs are broadcasted by the AP in all Beacon frames, all non-AP STAs of the BSS are expected to be aware of all the Enhanced TWT SPs supported by the associated AP and refrain from attempting to transmit during any of the Enhanced TWT SPs in which they are not a member, or if they do not have designated traffic even if they are a member of the TWT SPs. One way to implement this may be: STA upon waking up for an enhanced TWT SP checks if it is a member of a TWT SP and has traffic belonging to the designated traffic type to transmit; if not, it sets its NAV for the duration of the TWT SP thereby restricting any EDCA transmissions (from the other traffic types).

Since the AP as well as all associated non-AP STAs are expected to be aware of all the Enhanced TWT SPs provided by the AP, all transmission opportunity (TXOP) obtained by either AP or non-AP STAs in the BSS just before the start of the Enhanced TWT SPs are expected to end before the start of the Enhanced TWT SPs However, it is noted that this is different from the baseline 802.11 rules. Currently, non-AP STAs are not required to be aware of the TWT SPs in which they are not a member and consequently the non-AP STAs are free to attempt transmission even during the TWT SP in which they are not a member.

While the concept of time/frequency based allocation of medium to devices or even traffic types may exist in other communication technologies and attempts have been made even in 802.11 in the past (e.g. HCF controlled channel access (HOCA) or Restricted Access Window (RAW)), they have not been successfully utilized due to the large signalling overhead and/or operational complexity. TWT is relatively low in complexity/overhead and is widely adopted since 802.11ax. With few modifications, TWT can be enhanced to provided prioritized service to designated traffic.

Figure 4A:
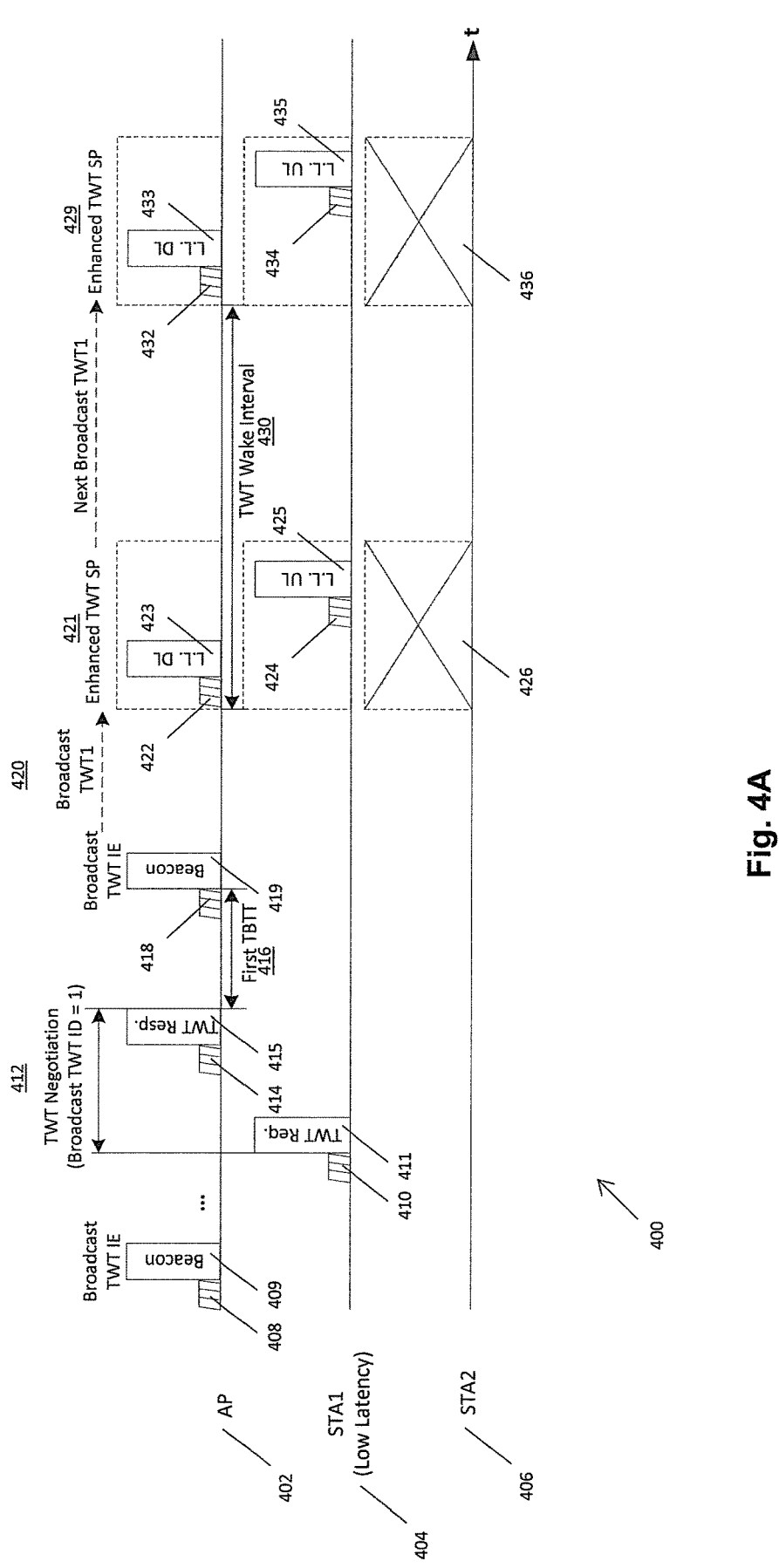
FIG. 4A shows a flow diagram illustrating communications for prioritized traffic according to an example of the first embodiment of the present disclosure.

FIG. 4A shows a flow diagram 400 illustrating communications for prioritized traffic according to an example of the first embodiment of the present disclosure. Contention based channel access procedures, e.g. EDCA procedures, are illustrated by blocks 408, 410, 414, 418, 422, 424, 432, 434. For simplicity, acknowledgment frames (e.g. ACK, Block-Ack frames) are not explicitly illustrated but they are understood to exist where required. AP 402 may transmit a Beacon frame 409 to advertise existence of Enhanced TWT SPs 421, 429, where only low latency traffic is allowed in the Enhanced TWT SPs 421, 429. Any STAs, which need to access channel during the Enhanced TWT SPs 421, 429, such as STA1 404, may then negotiate membership for the Enhanced TWT SPs 421, 429 with AP 402 through TWT request/response frames exchange. In particular, during TWT negotiation phase 412, STA1 404 transmits a TWT request frame to AP 402 requesting a membership for the Enhanced TWT SPs 421, 429 while the AP 402 then transmit a TWT response frame to STA1 404 granting the membership. In the TWT negotiation phase 417, STA1 404 can request, suggest or demand a set of TWT parameters of the Enhanced TWT SPs 421, 429 and AP 402 can accept or reject, or proposed an alternative setting. First TBTT 416 may also be negotiated during the negotiation phase 412. As such, STA1 is now allowed to access channel and exchange low latency traffic during the Enhanced TWT SPs 421, 429. The Broadcast TWT ID field of a TWT element included in the TWT request frame or the TWT response frame is set to a non-zero value (e.g. 1) to indicate a broadcast TWT.

STA1 may goes to doze state and wakes up after First TBTT 416 to receive a Beacon frame 419 from AP 402. The Beacon frame 419 may comprise a Broadcast TWT element which includes further TWT information such as Broadcast TWT (e.g. Broadcast TWT1 420), TWT Wake Interval 430 and minimum TWT wake up duration (as indicated in dashed line boxes for the Enhanced TWT SP 421, 429). The TWT element further indicates that this is an Enhanced TWT and only Low Latency traffic is allowed to be transmitted during this TWT SP.

STA1 may go to sleep after receiving the Beacon frame 419 and wake up for the Broadcast TWT1 SP 421. Since STA1 is a member of the TWT TP and has Low Latency (L.L.) traffic to transmit, STA upon waking up for the enhanced TWT SP, does not set its NAV. During this first Enhanced TWT SP 421, AP 402 and STA1 404 exchange low latency traffic such as low latency downlink (L.L. DL) signal 423 and low latency uplink (L.L. UL) signal 425, respectively.

STA1 404 may go to sleep after the end of the first Enhanced TWT SP 421. According to the TWT Wake Interval 430 specified either in the negotiation phase or the Beacon frame 419, STA1 404 may wake up for the next Broadcast TWT1 SP 429. During this second Enhanced TWT SP 429, AP 402 and STA1 404 transmit a L.L. DL PPDU 433 and a L.L. UL PPDU 435 respectively.

On the other hand, any third party STAs such as STA2 406, which has not negotiated membership with AP 402 and thus is not a member of the Enhanced TWT SP, is not allowed to access channel during the Enhanced TWT SPs 421, 429, as illustrated by dashed line boxes 426, 436. This may be achieved by STA2, upon waking up for the enhanced TWT SPs 421 and 429, checking if it is a member of the enhanced TWT SP; and since it is not, setting its NAV for the duration of the TWT SPs.

It is noted that ACK/BA are not shown in the figures but are assumed to be present where applicable. As mentioned earlier, it is assumed that the AP has gathered the low latency traffic characteristics/needs of non-AP STAs for e.g. using TSPEC. In the example, even if STA2 is a member of the TWT SP, if it does not have low latency traffic to transmit, it may not initiate transmission of any other traffic during the TWT SP. As an alternative, instead of the entire TWT SP, only a portion of it (e.g. the first half of the SP, or the time period indicated by the Nominal Minimum TWT Wake Duration) may be "Reserved" for designated traffic from member STAs i.e. only a portion of the TWT SP is restricted for the other traffic types or for 3rd party STAs. This may be achieved by STAs upon waking up for an enhanced TWT SP checking if it is a member of the TWT SP and has traffic belonging to the designated traffic type to transmit; if not, it sets its NAV for the duration reserved for the designated traffic e.g. the first half of the SP, or the time period indicated by the Nominal Minimum TWT Wake Duration of the TWT SP.

It is noted that HE Subchannel Selective Transmission (SST) operation allows non-AP STAs to be parked on non-primary channels (e.g. secondary 20 MHz channel, or secondary 80 MHz channel) during a Triggered TWT SP. An HE SST non-AP STA and an HE SST AP may set up SST operation by negotiating a trigger-enabled TWT as defined in 26.8.2 (Individual TWT agreements). This may be further enhanced by 11be to allow SST operation within 320 MHz.

Figure 4B:
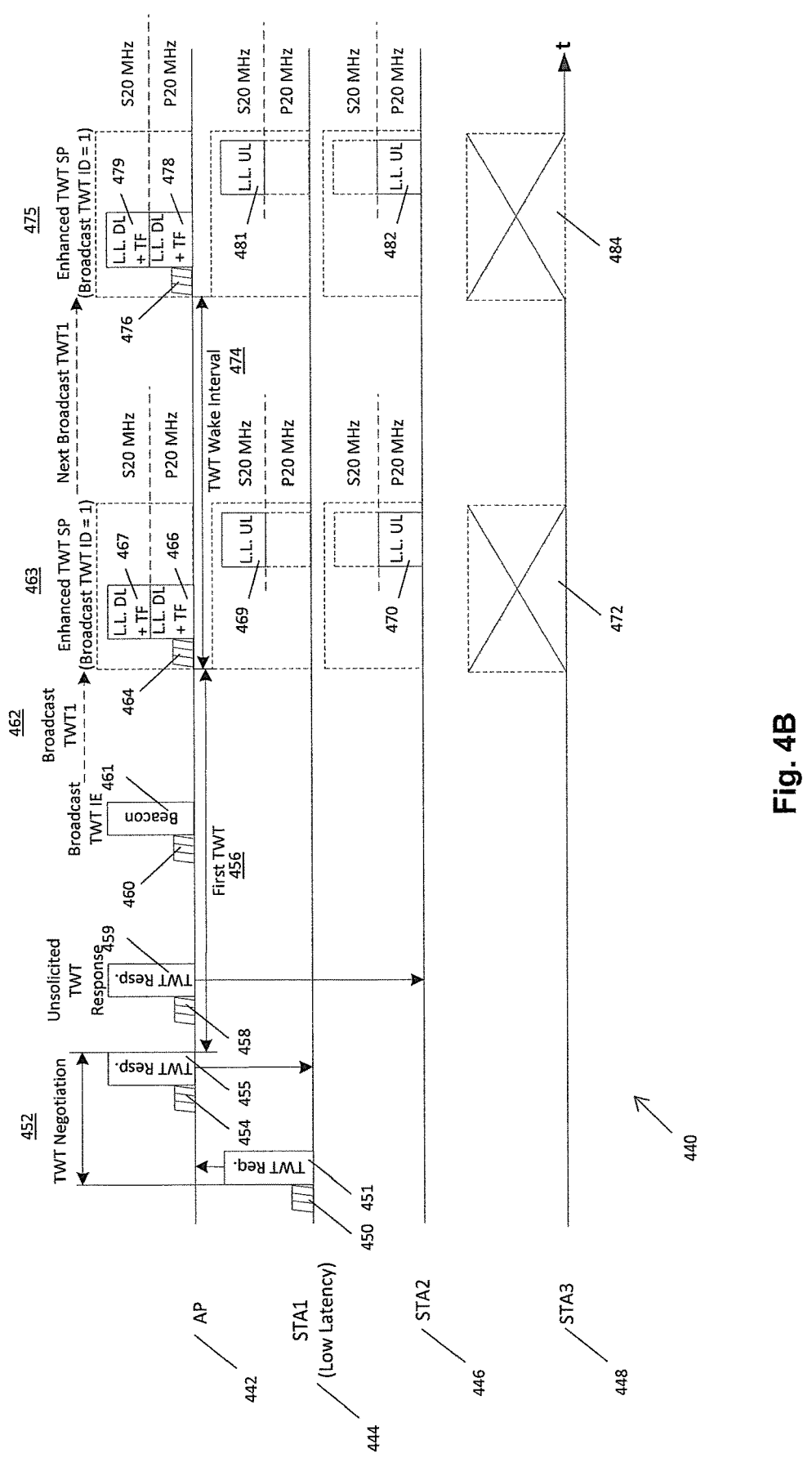
FIG. 4B shows a flow diagram illustrating communication for prioritized traffic according to another example of the first embodiment of the present disclosure.

FIG. 4B shows a flow diagram 440 illustrating communication for prioritized traffic according to another example of the first embodiment of the present disclosure. In this example, an enhanced broadcast TWT SP is overlaid over individual TWT SP/s to prevent third party STAs from transmitting during the TWT SPs. Multiple STAs may be scheduled on different sub-channels within the TWT SP using SST to further reduce contention within the Enhanced TWT SPs.

Contention based channel access procedures, e.g. EDCA procedures, are illustrated by blocks 450, 454, 458, 460, 464, 476. In this embodiment, STA1 444 may create a new TWT session by transmitting a TWT request frame 451 to AP 442, and AP 442 may respond with a TWT response frame granting STA1 444 a membership to the newly created TWT SP. A set of TWT parameters such as First TWT 456 is negotiated through the TWT request/response frames exchange and a TWT agreement for an Individual TWT SP between AP 442 and STA1 444 is set up. STA1 may then go to sleep until the TWT SP starts after the first TWT 456.

AP 402 may transmit an unsolicited TWT response frame 459 to STA2 446 to set up another TWT agreement for individual TWT SP overlaid with that with STA1 447. The unsolicited TWT response frame 459 includes a transmission time and a set of TWT parameters for TWT SP to schedule STA2 466 for simultaneous transmission in the TWT SP. In this embodiment, STA1 444 and STA2 446 are scheduled on secondary 20 MHz subchannel (S20 MHz) and primary 20 MHZ subchannel (P20 MHz) respectively within the TWT SP using SST.

Subsequently, AP 442 transmits a Beacon frame 461 to advertise existence of enhanced broadcast TWT SPs 463, 475. The Beacon frame 461 may comprise a Broadcast TWT element which includes further TWT information such as Broadcast TWT (e.g. Broadcast TWT1 462), TWT Wake Interval and minimum TWT wake up duration (as indicated in dashed line boxes for the Enhanced TWT SP 463, 475) and the designated traffic type (Low Latency). Further, Both STA1 444 and STA2 446 may wake up to receive the Beacon frame 461 and go back to sleep. Third party STAs e.g. STA3 also receives information of the Enhanced TWT SPs through the TWT element in the Beacon frame 461.

In this embodiment, the enhanced broadcast TWT SPs 463, 475 is overlaid over the individual TWT SPs of STA1 444 and STA2 446. STA1 444 and STA2 446 wake up for the Broadcast TWT1 SP 463. Since STA1 and STA2 both are members of the TWT SP and both have low latency traffic to transmit, they do not set their NAV, while third party STAs e.g. STA3 may not even wake up for the TWT SP, or if they did, since they are not a member of the TWT SP, they will set their NAV for the duration of the TWT SP. During this first Enhanced TWT SP 463, AP 402 simultaneously sends a set of L.L. DL PPDU and Trigger frame (TF) 466, 467 to each of STA1 444 and STA2 446 using S20 MHz and P20 MHz subchannels respectively, and STA1 444 and STA2 446 respond with a L.L. UL PPDU 469, 470 using S20 MHz and P20 MHz subchannels respectively as scheduled.

STA1 444 and STA2 446 may go to sleep after the end of the first Enhanced TWT SP 463. According to the TWT Wake Interval 474 specified either in the negotiation phase 452 or the Beacon frame 461, STA1 444 and STA2 446 may wake up for the next Broadcast TWT1 SP 475. During this second Enhanced TWT SP 475, AP 402 again sends a set of L.L. DL PPDU and Trigger frame (TF) 478, 479 to each of STA1 444 and STA2 446 using S20 MHz and P20 MHz subchannels respectively, and STA1 444 and STA2 446 respond with a L.L. UL PPDU 481, 482 using S20 MHz and P20 MHz subchannels as scheduled.

On the other hand, any third party STAs such as STA3 448, which has not negotiated membership with AP 442 and thus is not a member of TWT SP or the Enhanced TWT SP, is not allowed to access channel during the Enhanced TWT SPs 463, 475, as illustrated by dashed line boxes 472, 484. This may be achieved, for example, by such STAs setting their NAVs for the duration of the TWT SP.

A TWT element can be included in any frame exchanged between an AP and a STA for broadcast TWT SP negotiation process. All the details of TWT agreement between an AP and a STA are carried within a TWT element. According to the present disclosure, the TWT element is modified to indicate an Enhanced TWT SP.

Figure 5:
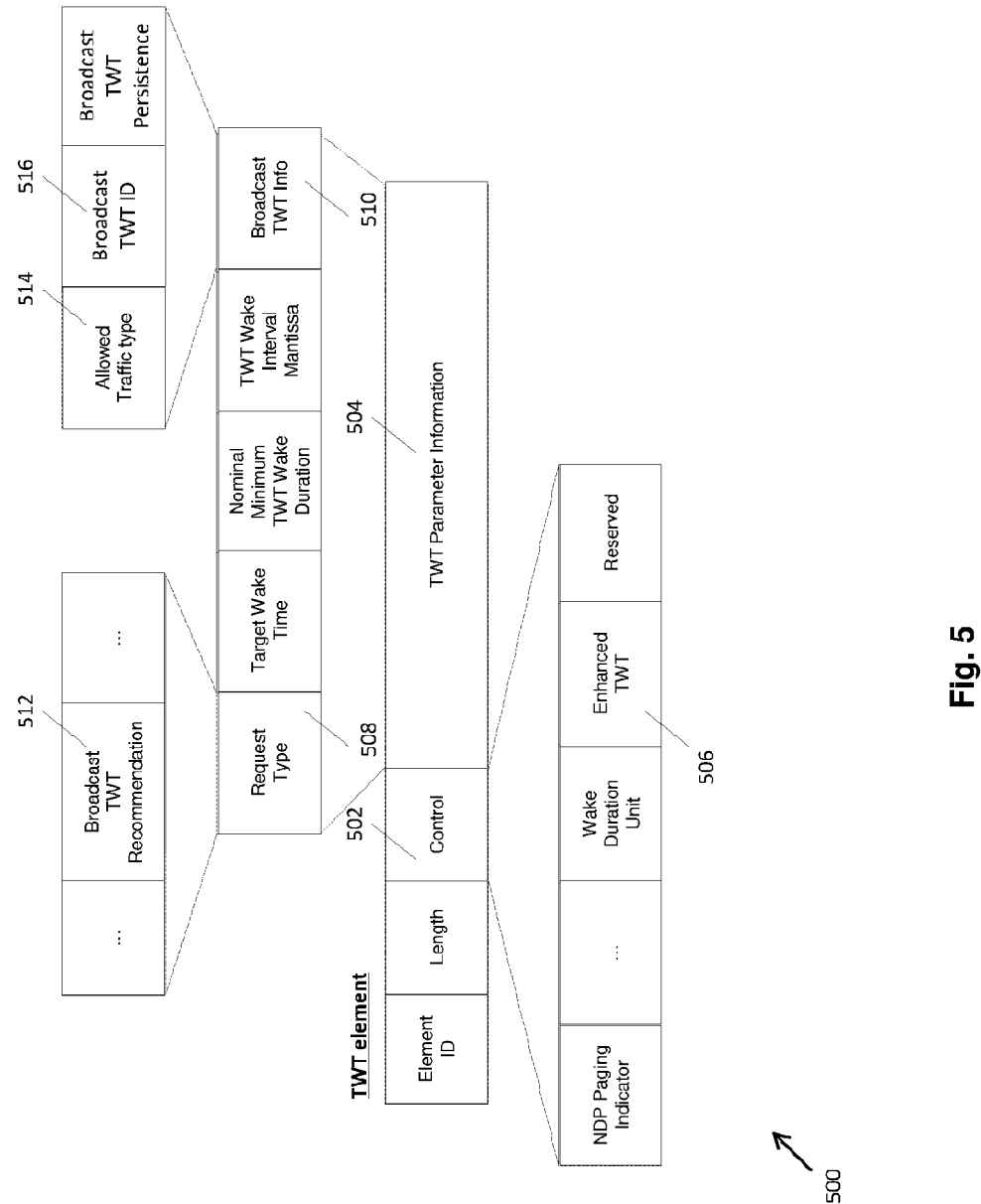
FIG. 5 shows an example format of a broadcast TWT element indicating an Enhanced TWT SP.

FIG. 5 shows an example format of a broadcast TWT element 500 indicating an Enhanced TWT SP. The TWT element 500 may consist of an Element ID field, a Length field, a Control field 502 and a TWT Parameter Information field 504. The Control field 502 further consists of an NDP (null data packet) Paging Indicator field, a Wake Duration Unit field and an Enhanced TWT field.

The TWT Parameter Information further consists of a Request Type field 508, a Target Wake Time field, a Nominal Minimum TWT Wake Duration field, a TWT Wake Interval Mantissa field and a Broadcast TWT Info field 510. The Request type field 508 further consists of a Broadcast TWT Recommendation field 512 while the Broadcast TWT Info field 510 further consists of an Allowed Traffic Type field 514, a Broadcast TWT ID field 516 and a Broadcast TWT Persistence field.

The Enhanced TWT field 506 may be one bit which is set to 1 to indicate this is an Enhanced TWT. The meaning of the Broadcast TWT Recommendation field 512 corresponding to its value is plotted in Table 2. In particular, a Broadcast TWT Recommendation field value of 4 indicates that Priority SP Restrictions apply. Different type of traffic may be allowed in the TWT SP based on the value of the Allowed Type field 514, as shown in Table 3. In particular, an Allowed Traffic type value of 0 indicates that low latency traffic is allowed during the TWT SP, whereas an Allowed Traffic type field value of 1 indicates that other priority traffic, e.g. NSEP, is allowed. The Broadcast TWT ID field is set to a non-zero value to indicate a broadcast TWT.

TABLE 2

Various meanings corresponding to Broadcast TWT Recommendation field value of a TWT element according to an embodiment.

| Broadcast TWT Recommendation field value | Description when transmitted in a broadcast TWT element |
|---|---|
| 0-3 | Existing meaning (11ax) |
| 4 | Priority Service Period Restrictions apply |
| 5-7 | Reserved |

TABLE 3

Different allowed traffic type corresponding to Allowed Traffic type field value of a TWT element according to an embodiment.

| Allowed Traffic Type field value | Allowed Traffic type |
|---|---|
| 0 | Low Latency Traffic |
| 1 | Other Priority Traffic (e,g. NSEP) |
| 2-3 | Reserved |

Alternatively, the Allowed Traffic Type (3 reserved bits available) may be mapped to the TID of the designated traffic, e.g. 0=TID 6 (AC VO); 1=TID 9 (new TID for low latency); 2=TID 11 (new TID for NSEP traffic) etc.

As explained earlier, one way to ensure STAs refrain from transmitting traffic that do not belong to the designated traffic during an Enhanced TWT SP is to have rules that a STA upon waking up for an enhanced TWT SP checks if it is a member of a TWT SP and has traffic belonging to the designated traffic type to transmit; if not, it sets its NAV for the duration of the TWT SP thereby restricting any EDCA transmissions (from the other traffic types). While entirely possible, to comply with such rules, all STAs need to be aware of all the Enhanced TWT SP advertised by the associated AP and set the NAV correctly at the start of each Enhanced TWT SP. However, the above is only possible for EHT (11be) and EHT$_+$ STAs that understand the TWT element for Enhanced TWT, but legacy (pre EHT) STA will not follow such NAV setting rules. According to present disclosure, an alternative method is also proposed: for protecting channel access from legacy (pre-EHT (extremely high throughput)) STAs, network allocation vector (NAV) setting legacy frame, such as RTS and CTS frame, carrying a special signal (e.g. one bit)) called a NAV Exclusion field, is used to indicate to an EHT (or EHT$_+$) STA that when such NAV setting legacy frame is received within an Enhanced TWT SP in which the EHT (or EHT$_+$) STA is a member, the EHT (or EHT$_+$) STA does not set its NAV (basic as well as intra-BSS NAVs) even if the EHT (or EHT$_+$) STA is not addressed by the frames.

In this case, either RTS/CTS or CTS-to-Self (transmitted by the AP and addressed to itself) may be used for such protection mechanism. Alternatively, or additionally, multiple RTS/CTS or CTS-to-Self frame exchange may be used within a single TWT SP to protect the entire TWT SP since the TWT SP may be longer than protection provided by the duration field in the CTS frame.

Figure 6:
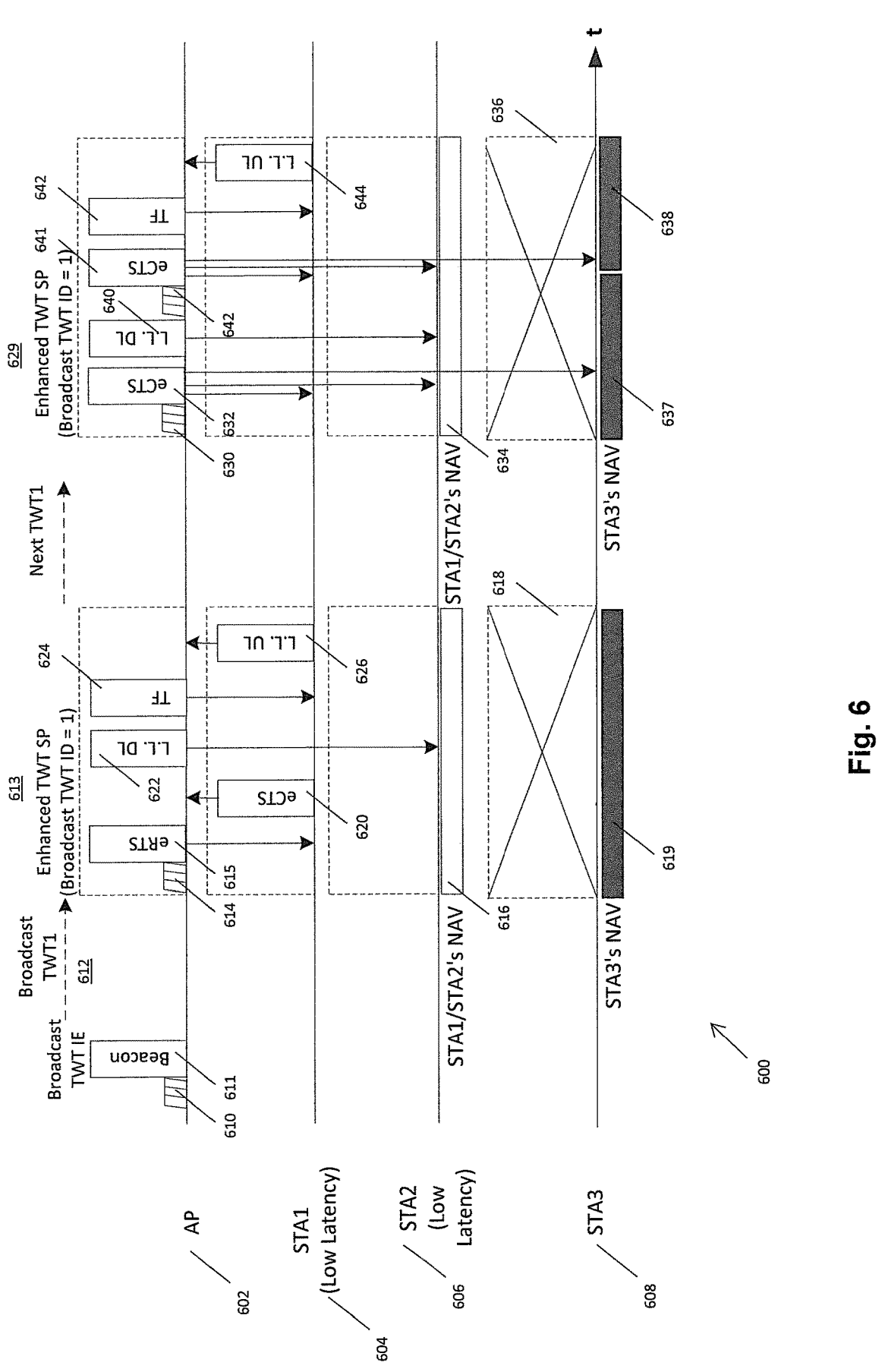
FIG. 6 shows a flow diagram illustrating communication for prioritized traffic according to still another example of the first embodiment of the present disclosure.

FIG. 6 shows a flow diagram 600 illustrating communication for prioritized traffic according to still another example of the first embodiment of the present disclosure. In this example, STA1 604 and STA2 606 are EHT (or EHT$_+$) STAs and have negotiated membership with AP 602 (member of Enhanced TWT SPs 613, 629) and thus are allowed to access channel during the Enhanced TWT SPs 613, 629; whereas STA3 608 is a legacy (pre-EHT) STA which the channel for prioritized traffic (e.g. low latency traffic) should be protected from.

Contention based channel access procedures, e.g. EDCA procedures, are illustrated by blocks 610, 614, 630, 642. AP 442 transmits a Beacon frame 611 which may advertise existence of enhanced broadcast TWT SPs 613, 629. The Beacon frame 611 comprises a Broadcast TWT element which includes TWT parameter information such as Broadcast TWT (e.g. Broadcast TWT1 612), TWT Wake Interval and minimum TWT wake up duration (as indicated in dashed line boxes for the Enhanced TWT SP 613, 629). After receiving the Beacon frame 611, STA1 604, STA2 606, STA3 608 may go to doze state.

After Broadcast TWT1 612, STA1 604, STA2 606, STA3 608 may wake up. During the first Enhanced TWT SP 613, AP 602 may transmit a NAV setting legacy frame 615, in this case RTS frame, addressed to STA1 604. As the RTS frame 615 is addressed to STA1 604, STA1 604, when it receives the RTS frame 615, will not set its NAV.

According to the present disclosure, as STA2 606 is a member of the Enhanced TWT SP 615, even though the RTS frame 615 was not addressed to STA2 606, due to the presence of the NAV Exclusion field, it will also not set its NAV. The STA1/STA2's NAV is illustrated by empty bar 616.

On the other hand, as STA3 608 is not a member of the Enhanced TWT SP 615, STA3 608 will set its NAV, regardless of the presence of the NAV Exclusion field, since the RTS frame 615 was not addressed to STA3 608. The STA3's NAV is illustrated by filled bar 619.

STA1 604, in response to receiving the RTS frame 615, transmits a CTS frame 620 in which the value of the NAV Exclusion field is copied from the NAV Exclusion field of the RTS frame 615. AP 602 may first transmit a L.L. DL PPDU 622 to STA2 606, and then a Trigger frame 624 to STA1 604 to schedule STA1's transmission. STA1 604 when receives the Trigger frame 624 will then transmit a L.L. UL PPDU 626 to AP 602. STA1 604, STA2 606, STA3 608 may go to doze state after then end of the first Enhanced TWT SP 615.

At the start of the next TWT1 SP 629, STA1 604, STA2 606, STA3 608 may wake up. AP 602 may transmit another NAV setting legacy frame 632 that has the NAV Exclusion field set to 1, in this case, a CTS-to-self frame 632, addressed to itself. As the CTS-to-self frame 632 is addressed to the AP 602, since both of the STAs are a member of the Enhanced TWT SP 629 and the NAV Exclusion field is set to 1, when they receives the CTS-to-self frame 632, they will not set their NAV, as illustrated by empty bar 634.

On the other hand, as STA3 608 is not a member of the Enhanced TWT SP 629, so even though the CTS-to-self frame 632 carries the NAV Exclusion field set to 1, STA3 608 will set its NAV. The STA3's NAV is illustrated by filled bars 637. AP may then transmit a Trigger frame 642 to STA1 604 to schedule STA1's transmission. STA1 604 when receives the Trigger frame 642 will then transmit a L.L. UL PPDU 644 to AP 602. As such, the access channel is protected from legacy STA, i.e. STA3 608. STA1 604, STA2 606, STA3 608 may go to doze state after then end of the second Enhanced TWT SP 629.

It is noted that one bit (e.g. the reserved bit #15 in the Request type field) in the Enhanced broadcast TWT SP indicates that TWT protection is enabled for this TWT SP. 2. If transmissions of the designated traffic (e.g. low latency) completes well before the end of the protected period (as indicated by the duration field of the eCTS frame), the AP may also transmit a CF-End frame (with RA set to broadcast address) to release the NAV of third party STAs.

Further, it is also noted that, in deployments where there are no pre-11ax legacy STAs (e.g. in the 6 GHz band), MU-RTS/CTS exchanges may be used instead to protect the Enhanced TWT SP. Although this protection (i.e. using NAV setting frames carrying the NAV Exclusion field) is targeted for legacy STAs, even EHT/EHT₊ non-AP STAs can benefit from this mechanism since they need not keep track of all Enhanced TWT SPs in the BSS, but can leave it to the AP to protect the Enhanced TWT SPs (e.g. using eRST/eCTS frames), hence making the operation simpler for the non-AP STAs.

Figures 7A, 7B:
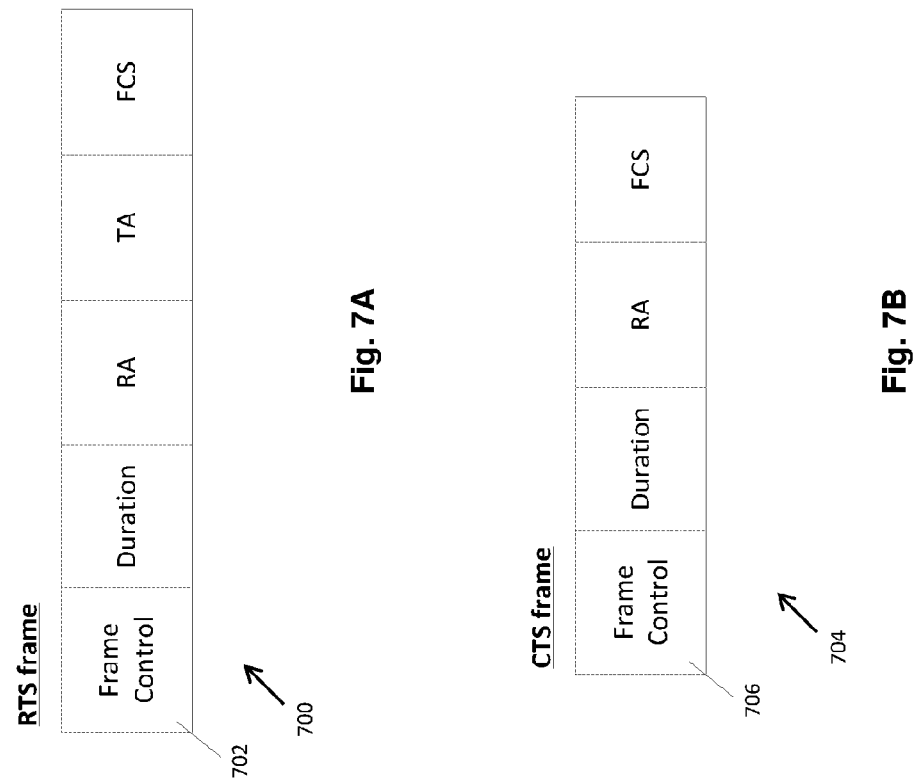
FIG. 7A shows an example format of a Request To Send (RTS) frame.
FIG. 7B shows an example format of a Clear To Send (CTS) frame.

FIGS. 7A and 7B shows an example format of a RTS frame 700 and a CTS frame 704. The RTS frame 700 consists of a Frame Control field 702, a Duration field, a Receiver Address (RA) field, a Transmitter Address (TA) field, a Frame Check Sequence (FCS) field. The CTS frame 704 consists of a Frame Control field 704, a Duration field, a RA field and a FCS field.

FIG. 8 shows an example Frame Control field 702, 706 of the RTS frame 700 and the CTS frame 706 in FIGS. 7A and 7B. The Frame Control field consists of a Protocol Version field, a Type field, a Subtype field, a To Differentiated Services (DS) field, a From FS field, a More Fragments field, a Retry field, a Power Management field, a More Data field, a Protected Frame field, and a ₊HTC (high throughput control) field.

Any one of the following fields, that are unused in Control frames, e.g. To DS field, From DS field, More Fragments field and Retry field, in RTS/CTS frames may be used (e.g. set to 1) to indicate NAV Protection exclusion to EHT/EHT₊ STAs. In various embodiments below, such unused field which is set to 1 to indicate NAV Protection exclusion may be called NAV Exclusion field.

If an EHT/EHT₊ STA receives an enhanced RTS frame 700 with the NAV Exclusion field set, for example to a value of 1, the STA shall set the same NAV Exclusion field and the value in the enhanced CTS frame that it sends as response. Additionally, if an EHT/EHT₊ STA receives an enhanced RTS/CTS frame 700, 704 within an Enhanced TWT SP in which the STA is a member, the STA does not set its NAV (basic as well as intra-BSS NAVs) even if the STA is not addressed by the RTS/CTS frames. Under such mechanism, legacy STAs will not understand such special signal (NAV Exclusion field) and will set their NAVs. As such, protection of the prioritized traffic from legacy STAs can be achieved.

Alternatively, it is also possible to have rules in the 11be specification that even without the "NAV Protection" field in RTS/CTS frames, a STA that is a member of an Enhanced TWT will not set its NAV if it receives a NAV setting frame e.g. RTS/CTS frame within the Enhanced TWT SP in which it is a member, even if the frame is not addressed to it.

In addition, a TWT Scheduling AP, may update the TWT Parameter (e.g. the allowed traffic type) of an existing TWT agreement for a future TWT SP by transmitting a TWT Information frame carrying an Allowed Traffic Type field to any of the member STAs of an enhanced broadcast TWT SP. For example, if an NSEP event is triggered, future Enhanced TWT SPs originally scheduled for low latency traffic may be converted to Enhanced TWT SPs for NSEP traffic.

Figure 9:
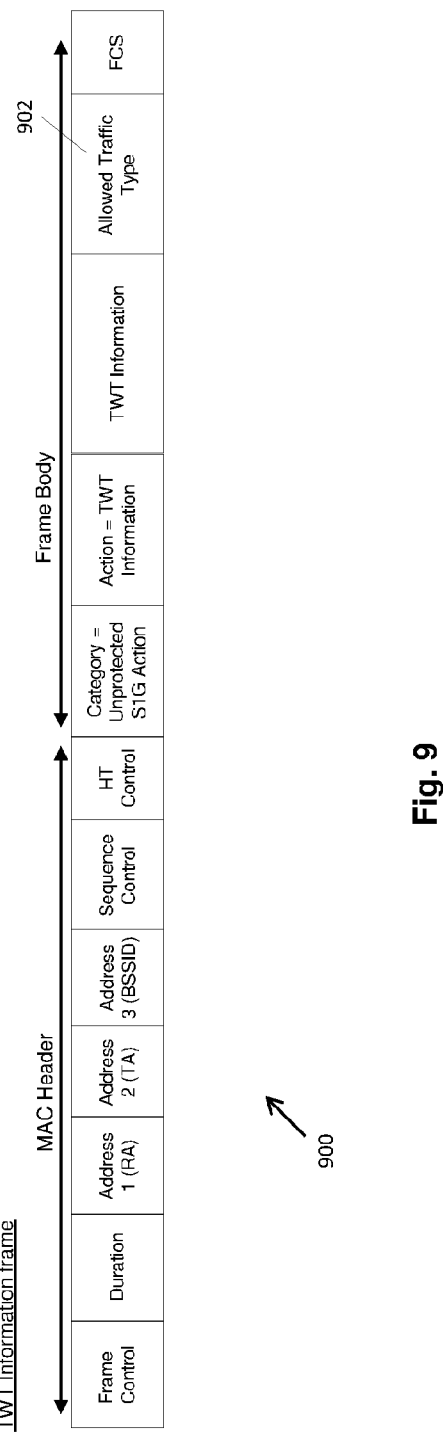
FIG. 9 shows an example format of a TWT information frame.

FIG. 9 shows an example format of a TWT information frame 900. The TWT Information frame consists of a Frame Control field, a Duration field, three Address fields (RA, TA, BSSID), a Sequence Control field, a HT Control field, a Category field (set to Unprotected S1G Action), an Action field (set to TWT Information), a TWT Information field, an Allowed Traffic Type field and a FCS field. The Frame Control field, the Duration field, the three Address fields (RA, TA, BSSID), the Sequence Control field, the HT Control field may be grouped as MAC Header. The Category field, the Action field, the TWT Information field and the Allowed Traffic Type field may be grouped as Frame body. Table 4 depicts the respective allowed traffic types under different Allowed Traffic Type field values.

TABLE 4

Various allowed traffic types of a TWT agreement under different Allowed Traffic Type field value of TWT Information frame.

| Allowed Traffic Type field value | Allowed Traffic Type |
|---|---|
| 0 | Low Latency Traffic |
| 1 | Other Priority Traffic (e.g. NSEP) |
| 2-3 | Reserved |

Upon receiving TWT information frame carrying an "Allowed Traffic Type" field, the member STAs of an enhanced broadcast TWT SP will update their record of the TWT SPs to reflect the new designated traffic types.

In the following paragraphs, a second embodiment of the present disclosure which relates to restricted Trigger frame is explained with reference to APs and STAs for prioritized traffic.

According to the second embodiment of the present disclosure, traffic restriction is not directly signaled in the Enhanced TWT. Instead, it is signaled using another frame transmitted within the Enhanced TWT SP. In fact, the TWT element for the TWT SP may not even have any indications that this is an Enhanced TWT. For example, an Enhanced TWT is always a Trigger enabled TWT and the Trigger frames transmitted within the Enhanced TWT signals the traffic restrictions. Under such mechanism, Trigger frames within Enhanced TWT prioritizes resource allocation to STAs with designated traffic. Further, Trigger frames with resource allocation to other traffic types may be scheduled only after member STAs signal that their designated traffic has all been transmitted (e.g. through buffer status report).

FIG. 10 shows a flow diagram 1000 illustrating communication for prioritized traffic according to the second embodiment of the present disclosure. Contention based channel access procedures, e.g. EDCA procedures, are illustrated by blocks 1010, 1016, 1032, 1034, 1036, 1038, 1040. In this example, all STA1 1004, STA2 1006 and STA3 1018 have negotiated membership for Enhanced TWT SPs. Further, STA1 1004 is configured for low latency traffic only;

STA2 1006 is configured for low latency and NSEP traffic; and STA3 1008 is configured for NSEP traffic only.

AP 1002 transmits a Beacon frame 1012 which may advertise existence of enhanced broadcast TWT SPs 1015, 1045. The Beacon frame 1012 comprises a Broadcast TWT element which includes TWT parameter information such as Broadcast TWT (e.g. Broadcast TWT1 1014), TWT Wake Interval and minimum TWT wake up duration (as indicated in dashed line boxes for the Enhanced TWT SP 1015, 1053). STA1 1004, STA2 1006, STA3 1008 are members of the TWT SPs. After receiving the Beacon frame 1012, STA1 1004, STA2 1006, STA3 1008 may go to doze state.

STA1 1004, STA2 1006, STA3 1008 may wake up at the start of the first Enhanced TWT SP 1015, AP 1002 may transmit a Trigger frame 1017 to STA1 1004 and STA2 1006 to allocate RUs for low latency traffic. STA1 1004 and STA2 1006 which receive the Trigger frame 1017 then transmit respective first response frame, e.g. L.L. UL PPDU 1018, 1020, to AP 1002. AP 1002 may respond to the L.L. UL PPDU 1020 with a L.L. DL PPDU 1022 to STA3 1008. Subsequently, AP may transmit another Trigger frame 1024 to STA1 1004 and STA2 1006 to allocate RUs for low latency traffic. STA1 1004 and STA2 1006 which receive the other Trigger frame 1017 then transmit respective second response frames, e.g. L.L. UL PPDUs 1026, 1028 to AP 1002. STA3 1008 does not has low latency traffic to transmit and is hence is not allocated resources at the start of the TWT SP.

It is noted that that the TFs within Enhanced TWT prioritize resource allocation to STAs with low latency traffic, e.g. STA1 1004 and STA2 1006. STA2's and STA3's NESP signal may be allowed to be transmitted after the designated traffic has all been transmitted and there is unused time left in the Enhanced TWT SP 1015, in which case the AP 1002 may transmit TF allocating RUs for NSEP traffic.

In the event that an NSEP event if triggered, a STA may request the AP for priority access for NSEP traffic. For example, after the first Enhanced TWT SP 1015 ends, STA2 1006 may transmit a NSEP request to AP 1002 to inform that an NSEP event has been triggered and to request to update the allowed traffic type to NSEP traffic. This triggers NSEP priority access of the channel. AP 1002 may send a NSEP Response frame to STA1 1004 to inform that a only NSEP frame is allowed in the future Enhanced TWT SP. In this case, STA1 1004 which is configured for low latency traffic is not allocated RUs by the AP during future Enhanced TWT SPs like the second Enhanced TWT SP 1053.

At the start of the second Enhanced TWT SP 1053, AP 1002 may transmit a Trigger frame 1041 to STA2 1006 and STA3 1008 to allocate RUs for NSEP traffic. STA2 1006 and STA3 1008 which receive the Trigger frame 1048 then transmit respective first uplink frame, e.g. NSEP frames 1042, 1044, to AP 1002. AP 1002 may also transmit downlink NSEP frame 1046 to STA3 1008. Subsequently, AP may transmit another Trigger frame 1046 to STA2 1006 and STA3 1008 to allocate RUs for NSEP traffic. STA2 1006 and STA3 1008 which receive the other Trigger frame 1046 then transmit respective second uplink frames, e.g. NSEP frames 1042, 1050, to AP 1002.

Figure 11:
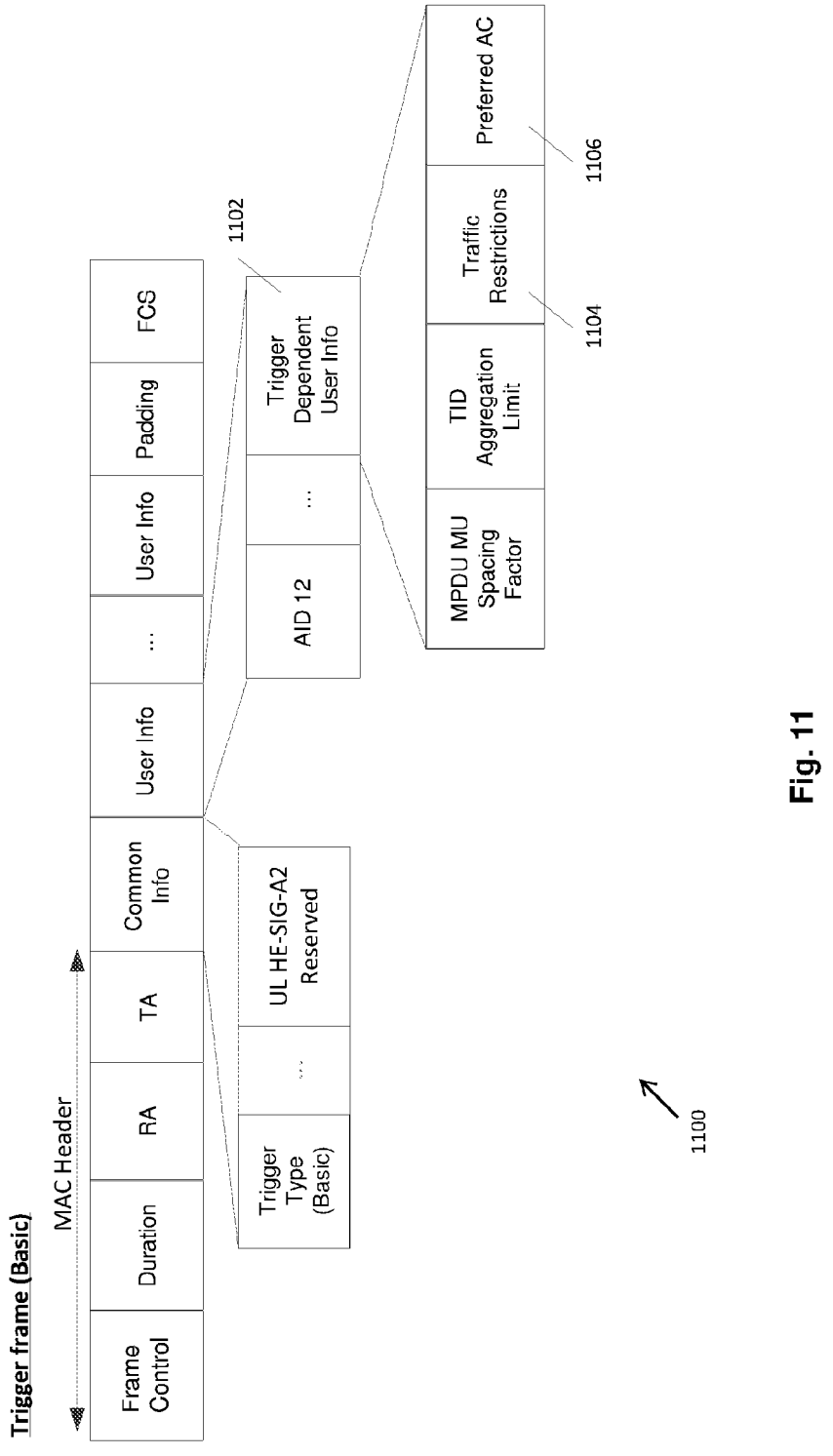
FIG. 11 shows an example Basic Trigger frame.

FIG. 11 shows an example Basic Trigger frame 1100. The Basic Trigger frame 1100 consists of a Frame Control field, a Duration field, a RA field, a TA field, a Common field, one or more User Info field, a Padding field and a FCS field. The Frame Control field, the Duration field, the RA field and the TA field may be grouped as MAC Header. The Common field further consists of a Trigger Type field (set to Basic type) and a UL HE-SIG-A2 Reserved field. Each of the one or more User Info field may further consist of an AID 12 field and a Trigger Dependent User Info field 1102 comprising a MAC Protocol Data Unit (MPDU) MU Spacing Factor field, a TID Aggregation Limit field, a Traffic Restrictions field 1104 and a Preferred Access Category (AC) field 1106. When the Traffic Restrictions field 1104 is set to 1, the Preferred AC field signals the allowed traffic type. Table 5 shows the allowed traffic types according to the Preferred AC field value.

TABLE 5

| Various allowed traffic types signaled by Preferred AC field value. | |
| --- | --- |
| Preferred AC field value | Allowed Traffic Type |
| 0 | Low Latency Traffic |
| 1 | Other Priority Traffic (e.g. NSEP) |
| 2-3 | Reserve. |

A non-AP STA, upon receiving the Basic Trigger frame 1100 containing an AID 12 field matching its AID, is allowed to transmit frames belonging to the allowed traffic type in a response frame (e.g. TB PPDU) to the Trigger frame 1100. It shall not transmit frames belonging to other traffic types.

Alternatively, the reserved bit used as Traffic Restriction field together with the 2 bits of the Preferred AC field (total 3 bits) may be mapped to the TID of the designated traffic, e.g. 0=TID 6 (AC VO); 1=TID 9 (new TID for low latency); 2=TID 11 (new TID for NSEP traffic) etc. Upon receiving a Basic Trigger frame containing an AID12 field matching its AID, the non-AP STA is only allowed to transmit frames belonging to the designated TID in the TB PPDU transmitted as a response to the Trigger frame. It shall not transmit frames belonging to other TIDs.

Another Option is for the Trigger dependent User Info field of the Trigger frame to include one additional octet to carry the Traffic restrictions (e.g. the TID of the designated traffic).

In the following paragraphs, a third embodiment of the present disclosure which relates to multi-link support is explained with reference to APs and STAs for prioritized traffic.

Multi-Link Device (MLD) are devices that house multiple STAs of the same type (APs or non-AP STAs) and allow simultaneous communication over multiple wireless links. Non-simultaneous transmit and receive link pair (NSTR) is a pair of links for which an MLD has indicated restrictions on simultaneous transmission on the par of link due to possible TX/RX interference between the links (e.g. due to the two links being close to each other in frequency leading to transmission by the MLD on one link of the pair causing the MLD being unable to receive on the other link).

The Enhanced TWT SPs on different links of a MLD may be negotiated (with the AP MLD) independently on each link, or if the TSF and Beacon Transmission Times (TBTTs) between links of an AP MLD are synchronized, the Enhanced TWT SPs for different links may also be negotiated together through a single negotiation on any of the links.

A NSTR non-AP multi-link devices (MLDs) that are assigned to Enhanced TWT SP on a first link should avoid transmitting during the TWT SP on any other link that causes co-device interference to the first link. To assist this, AP MLD and non-AP MLD can negotiate Enhanced TWT SPs that overlap in time on different links (with same or different TWT IDs). In particular, When the AP MLD transmits DL prioritized traffic during the Enhanced TWT SP in the first link, the AP MLD can make sure that the non-AP MLD does not transmit UL PPDU on the second link of the NSTR link pair at the same time, either by: (i) transmitting DL PPDU on the second link to the non-AP MLD or other non-AP STAs; or (ii) trigger UL PPDU on the second link from other non-AP STAs.

Figure 12:
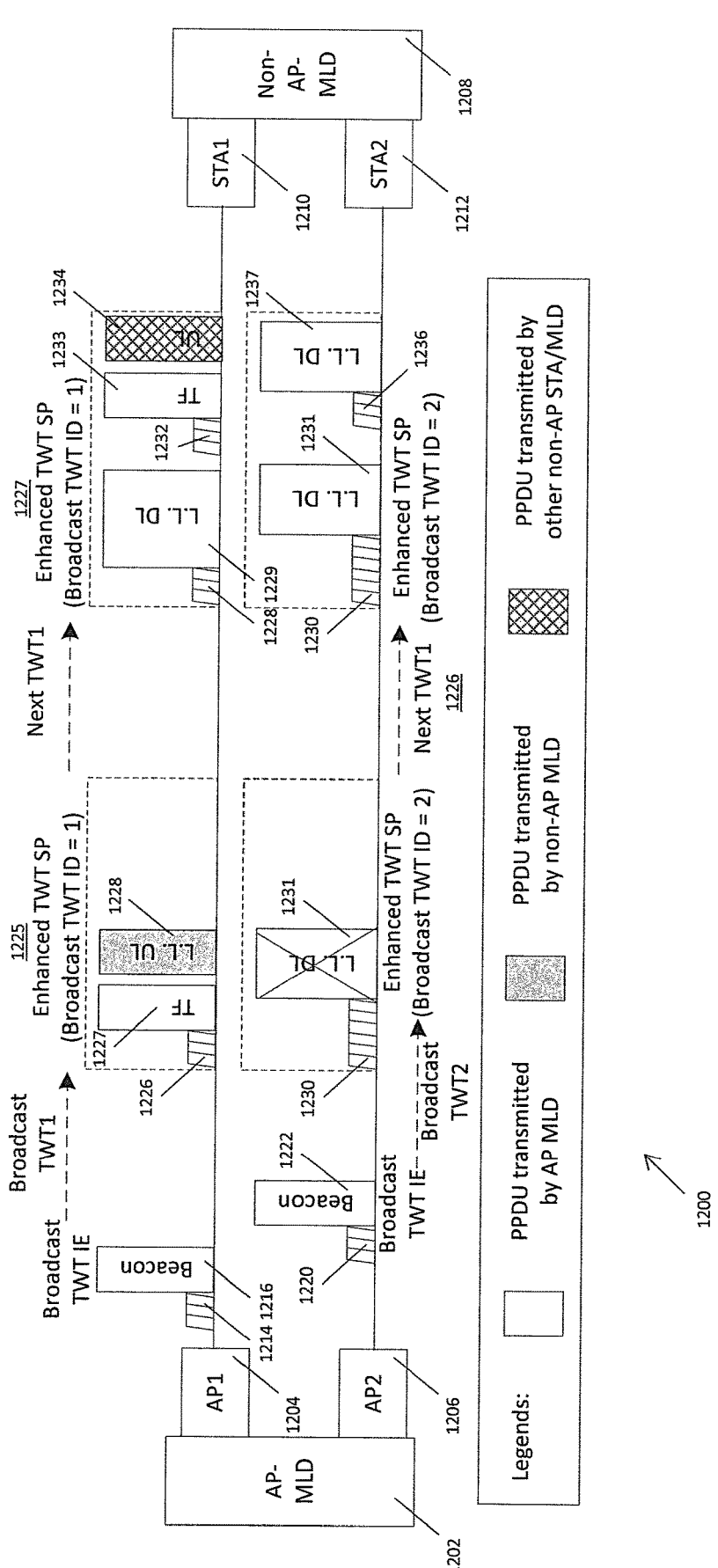
FIG. 12 shows a flow diagram illustrating communication for prioritized traffic according to a third embodiment of the present disclosure.

FIG. 12 shows a flow diagram 1200 illustrating communication for prioritized traffic according to the third embodiment of the present disclosure. In this embodiment, AP-MLD 1202 transmits a first Beacon frame 1216 to non-AP MLD 1208 via a first link, i.e. from AP1 1204 to STA1 1210. Subsequently, AP-MLD 1202 transmits a second Beacon frame 1222 to non-AP-MLD 1208 via a second link, i.e. from AP2 1206 to STA2 1212. The first and second Beacon frames 1216, 1222 may advertise existence of Enhanced TWT SPs (under Broadcast TWT ID 1 and 2, respectively) and TWT parameters information (e.g. Broadcast TWT1 and Broadcast TWT2, respectively). In the first Enhanced TWT SP 1225, AP-MLD 1202 may transmit a Trigger frame 1227 to non-AP-MLD 1208 via the first link. Non-AP-MLD 1208 then transmits a response frame, e.g. L.L. UL PPDU 1228, under the prioritized traffic back to AP-MLD 1202 in response to the Trigger frame 1227 via the first link; whereas AP-MLD 1202 is not allowed to transmit a L.L. DL PPDU 1231 via the second link at the same time, since this frame is very likely to be lost due to interference from the uplink frame 1228. This is because UL transmission (e.g. L.L. UL PPDU 1228) on one link of a NSTR link pair will causes DL PPDU (e.g. L.L. DL PPDU 1231) on another link to fail; therefore, such cases should be avoided.

For example, in the second Enhanced TWT SP 1227, AP-MLD 1202 may transmit two L.L. DL PPDUs 1229, 1231 to non-AP-MLD 1208 via the first link and the second link respectively (the transmission of the first link and second link may not be synchronized due to different EDCA procedures 1228, 1230). Subsequently, AP-MLD 1202 may transmit a Trigger frame 1223 to other non-AP-MLD or non-AP STAs (not shown) via the first link. Subsequently, AP-MLD 1202 may receive UL PPDU from the other non-AP STA/MLD via the first link while at the same time AP-MLD 1202 may transmit a L.L. DL PPDU 1237 addressed to non-AP-MLD 1208. In this case, since STA1 1210 is not transmitting at the same time, STA2 1212 can correctly receive the DL PPDU 1237.

Figure 13:
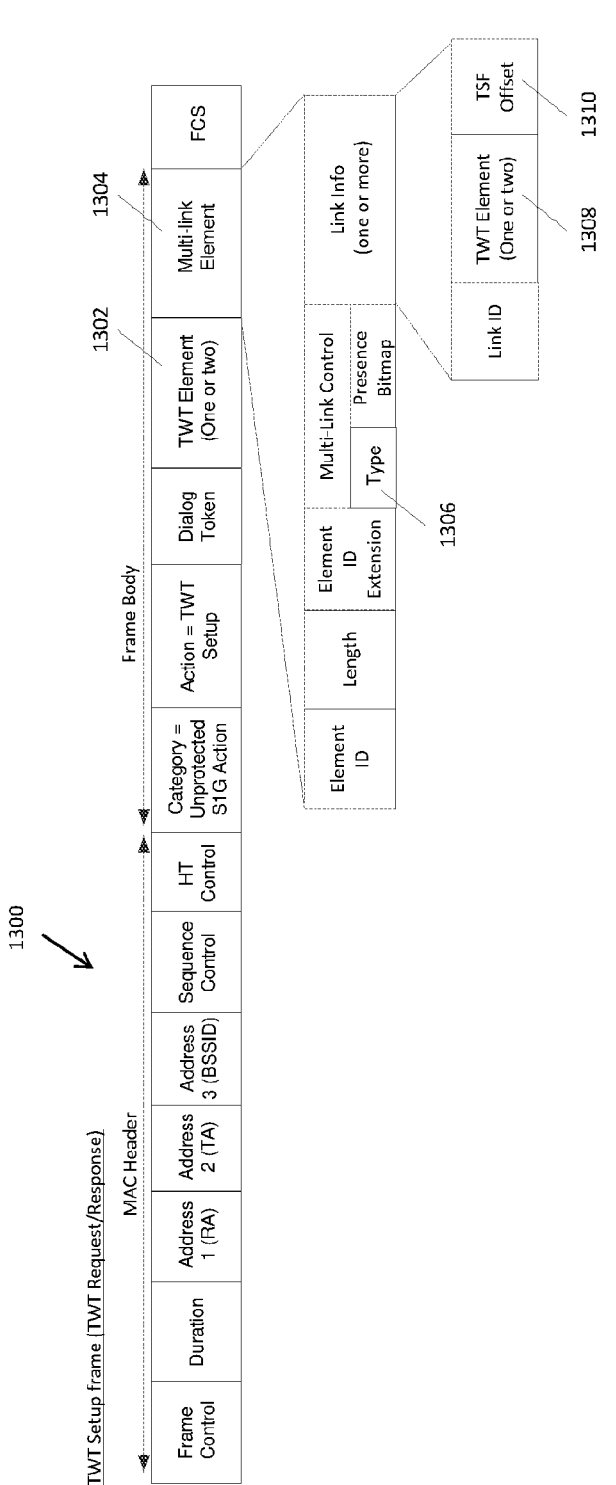
FIG. 13 shows an example TWT Setup frame.

FIG. 13 shows an example TWT Setup Frame 1300 that may be used to simultaneously negotiate TWT agreements for multiple links. The Setup frame may consist of a Frame Control field, a Duration field, three Address fields (RA, TA, BSSID), a Sequence Control field, a HT Control field, a Category field (set to Unprotected S1G Action), an Action field (set to TWT Setup), a Dialog Token field, a TWT Element field (one or two) 1302, a Multi-link Element field 1304 and a FCS field. The Frame Control field, a Duration field, the three Address fields, the Sequence Control field and the HT Control field may be grouped as MAC Header. The Category field, the Action field, the Dialog Token field, the TWT Element field 1302 and the Multi-link Element field 1304 may be grouped as Frame body.

The TWT Element field 1302 carries information of TWT SPs of link on which the TWT Setup frame is transmitted. The Multi-link Element field 1304 consists of an Element ID field, a Length field, an Element ID Extension field, a Multi-Link Control field (including a Type field 1306 and a Presence Bitmap field) and a Link Info field (one or more). The Type field of the Multi-Link Control field is set to Multi-Link TWT Setup. The Link Info field further consists of a Link ID field, a TWT Element field (carrying one or two TWT elements) 1308 and a Timing Synchronization Offset (TSF) Offset field 1310. The TWT Element field 1308 in the Link Info field carries information of TWT SPs of the link corresponding to the Link ID. The TSF Offset field 1310 relates to a difference in the TSF between the link on which the TWT Setup frame is transmitted and the link corresponding to the Link ID. Such TWT Setup frame 1300 that carries a Multi-link element is used to setup the Enhanced TWT SPs for different links together through a single negotiation on any of the links.

In the following paragraphs, a fourth embodiment of the present disclosure which relates to prioritized Uplink OFDMA-based Random Access (UORA) is explained with reference to APs and STAs for prioritized traffic.

To address priority access for non-periodic designated traffic, UORA is customized as "Prioritized UORA" such that UORA access to prioritized Random Access Resource Units (RA-RUs) is restricted to designated traffic. In particular, a prioritized RA-RU is a RA-RUs that has traffic restrictions applied to it (e.g. Traffic Restrictions field 1104 of Basic Trigger frame 1100 is set to 1) and a prioritized RA-RU is considered eligible RA-RU only for STAs that fulfil the traffic restrictions on the RA-RU. The Prioritized OFDMA backoff (POBO) of the qualifying STAs can count down on all eligible RA-RUs including Prioritized RA-RUs but the OFDMA backoff (OBO) of non-qualifying STAs cannot count down on Prioritized RA-RUs. STA wins UORA contention if either POBO or OBO is zero.

FIG. 14 shows a prioritized UORA procedure according to the fourth embodiment of the present disclosure. In this case, STA1 and STA2 are configured for low latency traffic and hence UORA contention will prioritize STA1 and STA2 over STA3. There is a prioritized RA-RU at RU1 and RU5 and a normal RA-RU at RU2-RU4 specified by the AP to the STAs (STA1, STA2, STA3) in a Trigger frame.

STA1 has an initial POBO of 5 while STA has an initial POBO of 4. For STA1 and STA2 which are configured for the designated low latency traffic, the number of eligible RA-RUs is 5 because STA1 and STA2 are able to access to prioritized RA-RUs and normal RA-RUs. Hence, STA1 and STA2 has a higher change of winning UORA.

The POBO of STA1 counts down from smaller or equal to 5 to 0 on the five eligible RA-RUs, RU1-RU5. As a result, STA1 wins UORA contentions and randomly picks one RA-RU (from RU1-RU5), e.g. RU1, for transmission in the response frame (TB PPDU). Similarly, the POBO of STA2 counts from smaller or equal to 5 to 0 on the five eligible RA-RUs, RU1-RU5. As a result, STA2 wins UORA contention and randomly picks one RA-RU (from RU1-RU5), e.g. RU3, for transmission in the response frame (TB PPDU).

On the other hand, STA3 which is configured for non-low latency traffic has an initial OBO of 4. The number of RA-RUs is 3 as STA3 is able to access only to normal RA-RUs (R2-R4). The OBO of STA3 counts down from larger than 5 to 2. As a result, STA3 does not win UORA contention, and the traffic from STA3 is restricted.

As an alternative to indicating RA-RU as Prioritized by signalling traffic restrictions in the Trigger frames, a reserved AID other than 0 (e.g. 2044) may be used to represent a Prioritized RA-RU. In such cases, STAs that have designated traffic to transmit, and that are not allocated fixed RUs in the Trigger Frame, can content for UORA contention with both normal RA-RUs (RUs with AID 0) as well as Prioritized RA-RUs (e.g. RUs with AID 2044) being considered eligible RA-RUs, whereas STAs that do not have designated traffic to transmit may also consider the normal RA-RUs (RUs with AID 0) as eligible RA-RUs.

In addition, prioritized UORA parameters may be used for designated traffic (e.g. low latency traffic). In particular, in addition to the OFDMA Contention Window (OCW) range for general UORA access, AP also advertise the prioritized OCW range for designated traffic in the UORA Parameter element.

Figure 15:
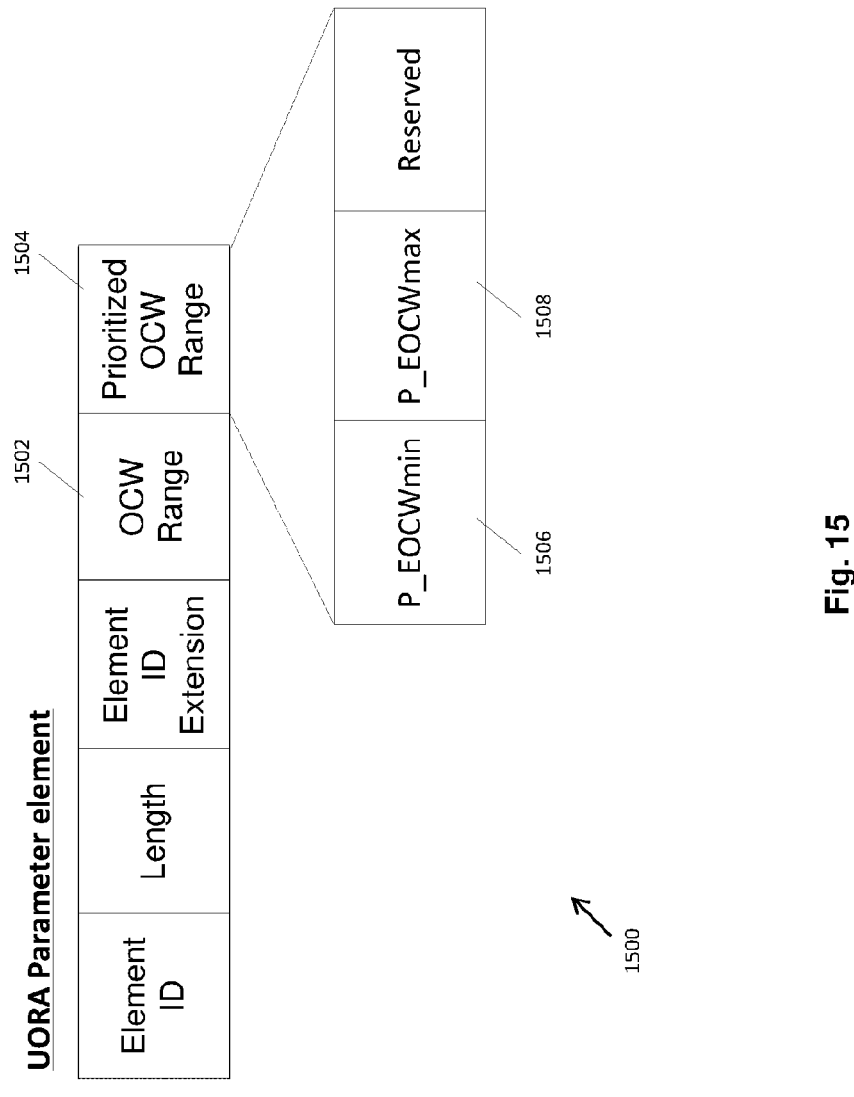
FIG. 15 shows an example UORA Parameter element.

FIG. 15 shows an example UORA Parameter element 1500. The UORA Parameter element 1500 consists of an Element ID field, a Length field, an Element ID Extension field, an OCW Range field 1502, a Prioritized OCW Range field 1504. The Prioritized OCW Range field 1504 further consists of a P_EOCWmin field, and a P_EOCWmax field which are used, together with POCW and POBO for the prioritized UORA access and to calculate P_OCWmin and P_OCWmax according to equations 1 and 2 respectively. It is noted that OCWmin, OCWmax, OCW and OBO are used for the default UORA access.

$$P\_OCWmin = 2^{P\_EOCWmin} - 1 \qquad \text{equation (1)}$$

$$P\_OCWmax = 2^{P\_EOCWmax} - 1 \qquad \text{equation (2)}$$

Relationship between P_OCWmin/max and OCWmin/max can be calculated based on equations 3 and 4.

$$P\_OCWmin \leq OCWmin \qquad \text{equation (3)}$$

$$P\_OCWmax < OCWmax \qquad \text{equation (4)}$$

POBO is an integer randomly selected in the range from 0 to POCW. By setting P_OCWmin and P_OCWmax to be lesser than OCWmin & OCWmax, AP ensures that the designated traffic types have higher changes of winning UORA access.

Alternatively, or in addition, STAs with designated traffic to transmit may be allowed to deduct its OBO by more than 1 (e.g. 2) for each Prioritized RA-RU or even normal RA-RU during the UORA contention, resulting in the OBO of such STAs being 0 with much higher probability than normal traffic.

In a prioritized UORA procedure, a non-AP EHT STA sets the value of POCW to the P_OCWmin obtained from the most recent POCWmin indicated in the Prioritized OCW Range field in the UORA Parameter Set element from the EHT AP or the default (if UORA Parameter Set element was not received) and initializes its POBO counter to an integer value randomly selected from a uniform distribution in the range 0 to POCW.

If the EHT STA has a pending prioritized frame for the AP, upon the reception of a Trigger frame containing at least one eligible RA-RU, contends for Prioritized UORA and transmits EHT TB PPDU as shown in the flowchart. In addition to the regular eligible RA-RUs, Prioritized RA-RUs are also considered eligible RA-RU if the STA has pending prioritized frame to transmit.

If the EHT TB PPDU is not successfully transmitted in the selected RA-RU, then the non-AP EHT STA updates its POCW to 2×POCW+1 when the POCW is less than the value of POCWmax, and randomly selects its POBO counter in the range of 0 and POCW. Once the POCW reaches POCWmax for successive retransmission attempts, the POCW remains at the value of POCWmax until the POCW is reset.

Figure 16:
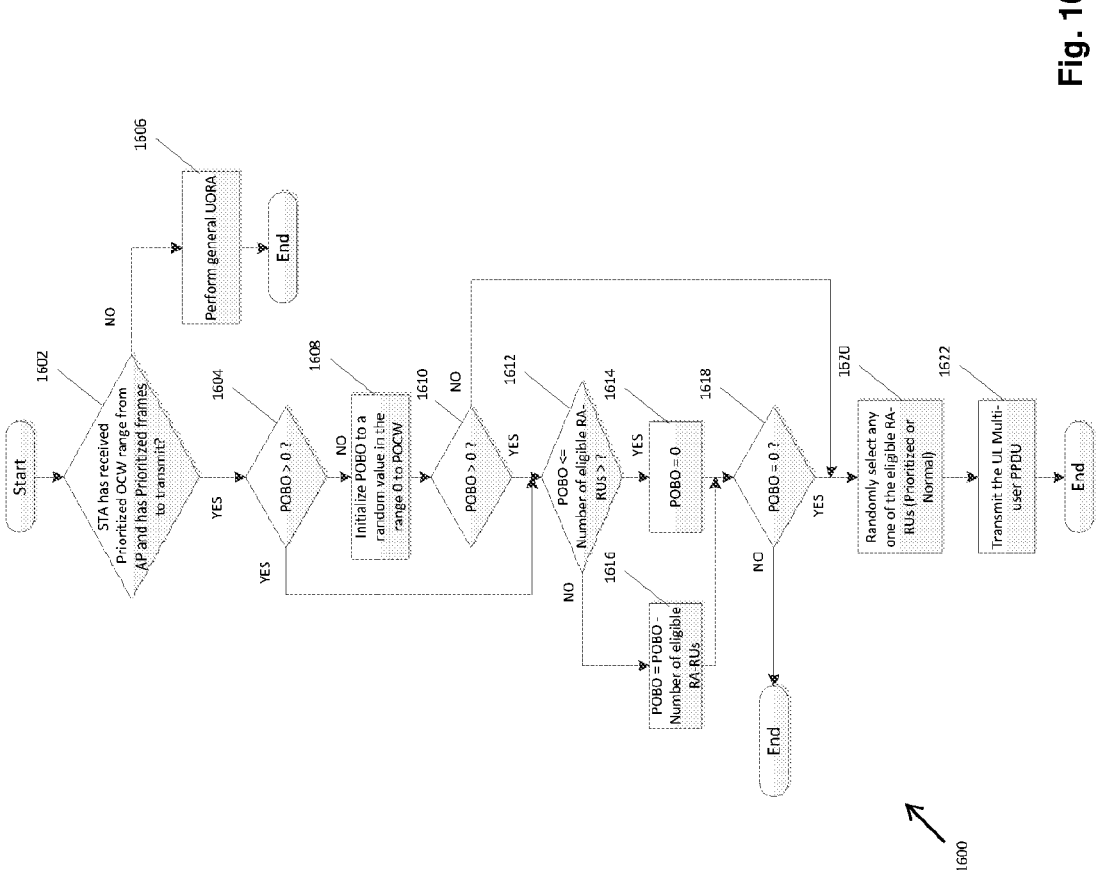
FIG. 16 shows a flow chart illustrating prioritized UORA procedures according to an embodiment of the present disclosure.

FIG. 16 shows a flow chart illustrating prioritized UORA procedures 1600 according to an embodiment of the present disclosure. In step 1602, it is determined if a STA has received prioritized OCW range from AP and has prioritized frames to transmit. If so, step 1604 is carried out. Otherwise, step 1606 is carried out where a general UORA is performed and the process may end. In step 1604, it is determined if POBO is larger than 0. If it is determined that POBO is not larger than 0, step 1608 is carried out. Otherwise, the process is skipped to step 1612.

In step 1608, POBO is initiated to a random value in the range of 0 to POCW. In step 1610, it is then determined again if POBO is larger than 0. If it is determined that POBO is larger than 0, step 1612 is carried out. Otherwise, the process is skipped to step 1620. In step 1612, it is determined if the POBO is smaller or equal to number of eligible RA-RUs. If so, the POBO is set to 0 and then step 1618 is carried out. If it is determined that the POBO is not smaller or equal to number of eligible RA-RUs, the POBO is set according to a difference in number between POBO and the number of eligible RA-RUs (POBO=POBO−number of eligible RA-RUs), and then step 1618 is carried out.

In step 1618, it is determined if POBO is 0. If it is determined the POBO is not the process may end. Otherwise, step 1620 is carried out. In step 1620, any one of the eligible RA-RUs (prioritized or normal RA-RUs) is randomly selected. In step 1622, the UL MU PPDU is transmitted, and the process may end.

Figure 17:
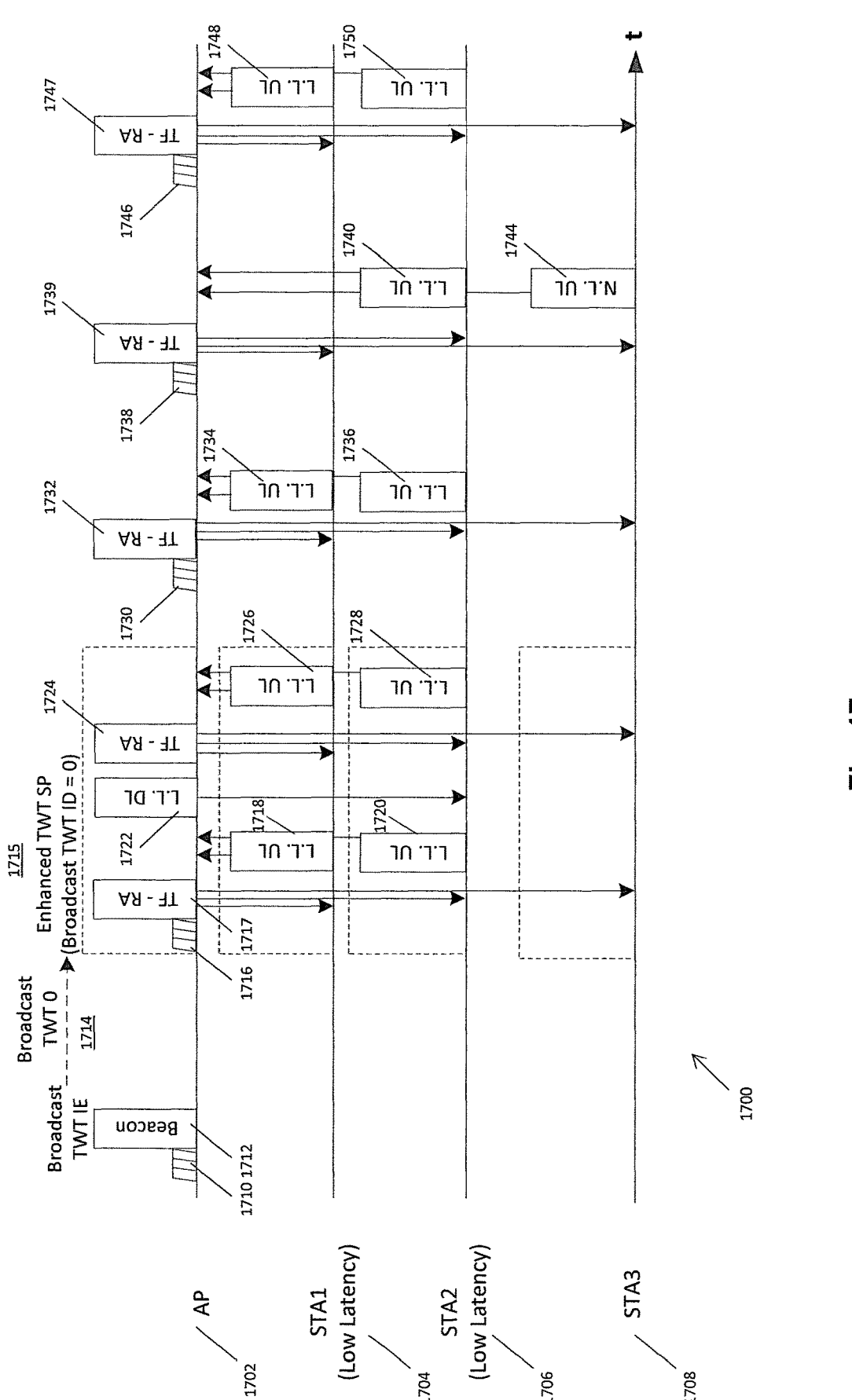
FIG. 17 shows a flow diagram illustrating for prioritized traffic according to a 30 fourth embodiment of the present disclosure.

FIG. 17 shows a flow diagram 1700 illustrating for prioritized traffic according to the fourth embodiment of the present disclosure. If an AP has knowledge that one or more associated STAs have prioritized traffic that are not periodic in nature, the AP can attempt to provide prioritized channel access to such STAs by transmitting Trigger frames allocating prioritized RA-RUs at regular intervals (e.g. less than the interval between consecutive enhanced TWT SPs). Contention based channel access procedures, e.g. EDCA procedures, are illustrated by blocks 1710, 1716, 1730, 1738, 1746. AP 1702 transmits a Beacon frame 1710 which may advertise existence of enhanced broadcast TWT SP 1715. The Beacon frame 1712 comprises a Broadcast TWT IE which includes TWT parameter information such as Broadcast TWT (e.g. Broadcast TWT1 1714) and minimum TWT wake up duration (as indicated in dashed line boxes for the Enhanced TWT SP 1715). After receiving the Beacon 1712, STA1 1704 and STA2 1706, which are configured for low latency traffic, may update UORA parameters such as P_OCWmin, P_OCWmax and POCW based on the most recent Prioritized OCW Range field in the UORA Parameter Set element in the Beacon frame 1712.

In the Enhanced TWT SP 1715, AP 1702 may transmit a Trigger frame 1717 with prioritized RA-RUs to STA1 1704, STA2 1706 and STA3 1708 to allocate RUs for prioritized traffic (e.g. low latency traffic). In this embodiment, STA1 1704 and STA2 1706 have prioritized traffic to transmit and use prioritized UORA to transmit respective first uplink frames, e.g. L.L. UL PPDU 1718, 1720; whereas STA3 does not have prioritized traffic to transmit and thus uses regular UORA and is not able to win the UORA contention. Subsequently, AP may transmit another Trigger frame 1724 to STA1 1704, STA2 1706 and STA3 1708. Similarly, STA1 1704 and STA2 1706 have prioritized traffic to transmit and use prioritized UORA to transmit respective second response frames, e.g. L.L. UL PPDU 1726, 1728, STA3 is still not able to win the UORA contention.

Next, after the end of the Enhanced TWT SP 1715, AP 1702 may transmit Trigger frames 1732, 1739, 1747 with prioritized RA-RUs to STA1 1704, STA2 1706 and STA3 1708. As STA1 1704 and STA2 1706 is eligible for both prioritized RA-RUs and normal RA-RUs, they have a higher chance of winning the UORA contention and use one of the RA-RUs (prioritized and normal) for transmission in the TB PPDU (e.g. L.L. UL PPDU 1734, 1736, 1740, 1748, 1750 respectively) in response to the Trigger frames 1732, 1739, 1747; whereas STA3 uses regular UORA and has a lower change of winning the UORA contention and use only the normal RA-RUs for transmission in the TB PPDU (e.g. normal latency UL PPDU 1744).

Figure 18:
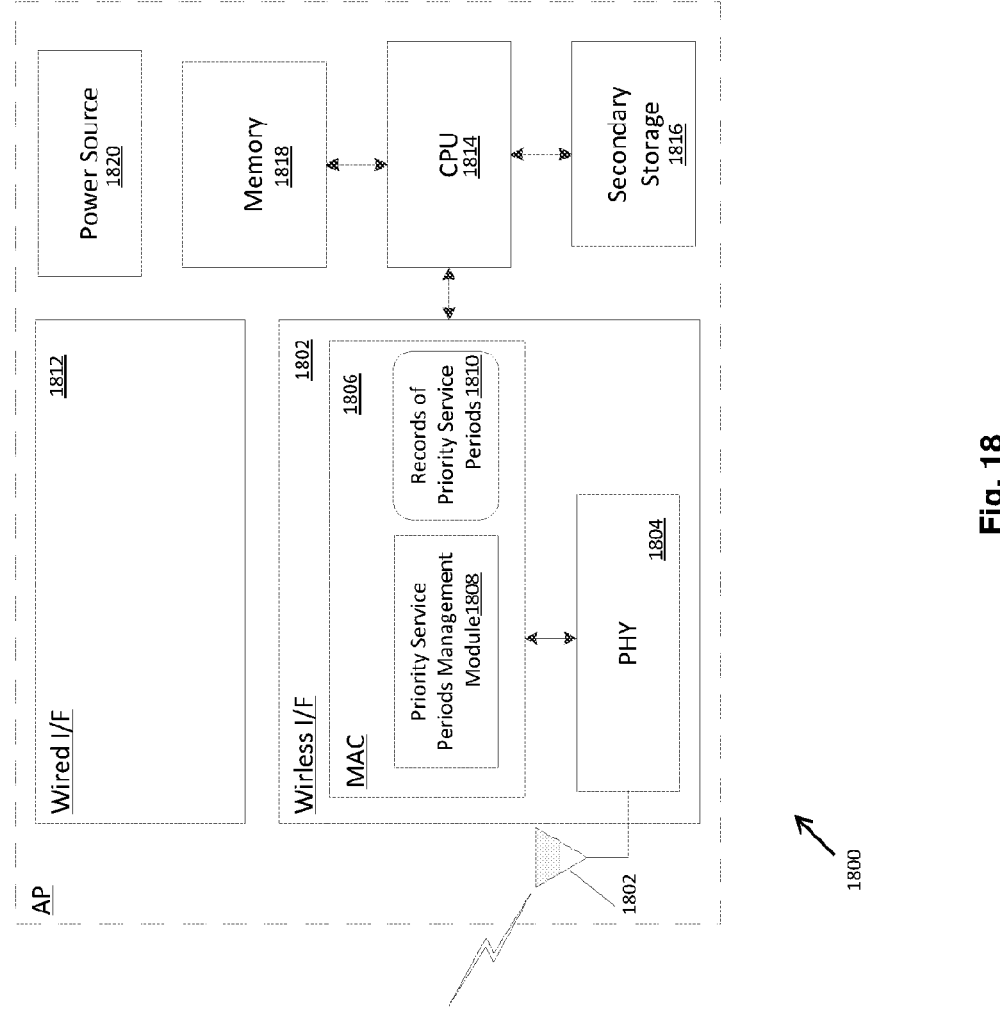
FIG. 18 shows a configuration of a communication apparatus, for example an AP, according to various embodiments of the present disclosure.

FIG. 18 shows a configuration of a communication apparatus 1800, for example a standalone AP or an affiliated AP of an AP MLD, according to various embodiments of the present disclosure. The communication apparatus 1800 may include at least one antenna 1802 for transmission and receipt of signals (for the sake of simplicity, only one antenna is shown in FIG. 18). The communication may comprise a Wired I/F module 1812, a Wireless I/F module 1802, a Power Source 1820, at least one memory 1818, a central processing unit (CPU) 1814 comprising at least one compressor and at least one secondary storage 1816. The Wireless I/F module 1802 may further comprise a MAC sublayer 1806 and a PHY sublayer 1804. The MAC sublayer 1806 comprises a Priority Service Periods Management Module 1808 that manages the Priority Service Periods for associated STAs and keep a record of all such SPs in the Records of Priority Service Period 1810. The Wireless I/F module 1812, the CPU 1814, the at least one memory 1818 and the at least one secondary storage 1816 may function together as circuitry of the communication apparatus 1800 configured to generate TWT response frame, Trigger frame, Multi-STA BlockAck frame, DL MU PPDU, Beacon frame L.L. DL PPDU, frame comprising a TWT element, RTS/CTS frame, TWT information frame, NSEP response frame, NSEP frame and TWT Setup frame for prioritized traffic (e.g. low latency traffic) as described in the present disclosure. The antenna 1802 may then transmit the generated frame(s) or PPDU(s) to other communication apparatus, e.g. STA(s). The antenna 1802 may receive TWT request frame, PS-Poll frame, QoS Null frame, BlockAck frame, TB PPDU (e.g. L.L. UL PPDU, UL PPDU), CTS frame, NSEP request frame, NSEP frame and TWT Setup frame from other communication apparatus, e.g. STA(s) for prioritized traffic (e.g. low latency traffic) as described in the present disclosure. The circuitry of the communication apparatus 1800 may then be configured to process the received frame(s) or PPDU(s).

Figure 19:
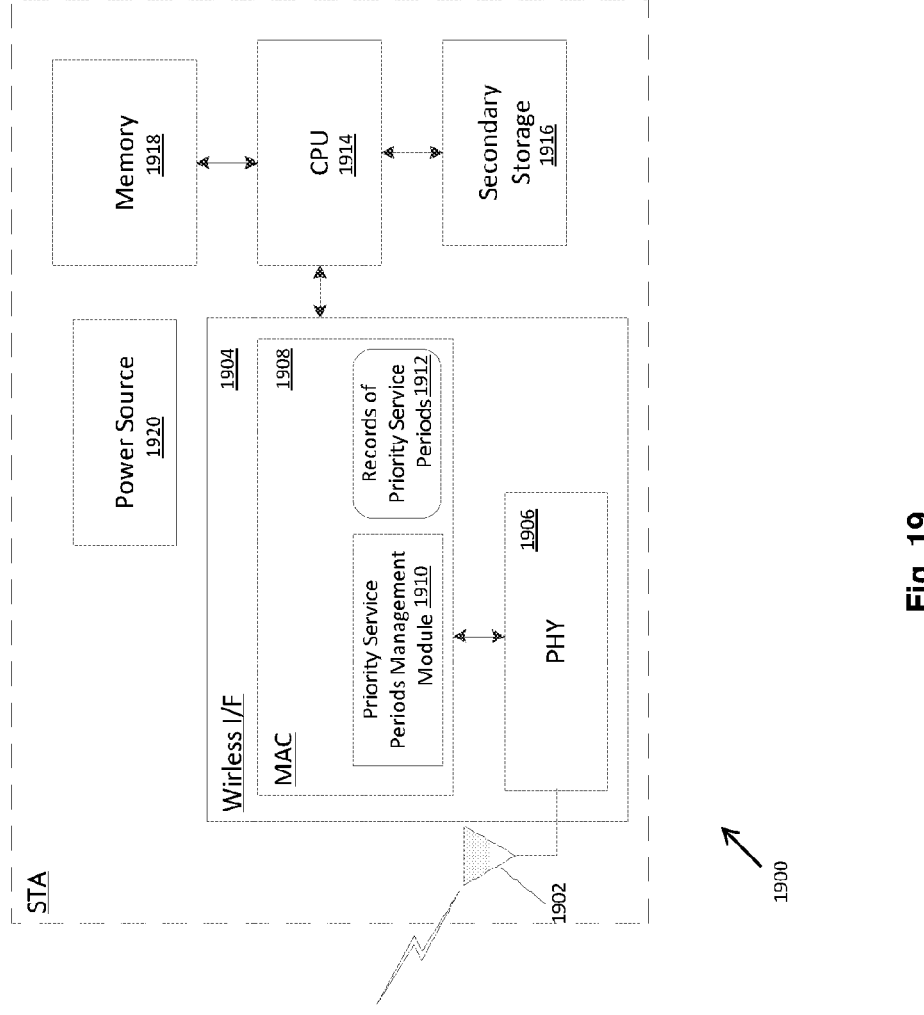
FIG. 19 shows a configuration of a communication apparatus, for example a non-AP or a STA, according to various embodiments of the present disclosure.

FIG. 19 shows a configuration of a communication apparatus 1900, for example a standalone STA or an affiliated STA of a non-AP MLD, according to various embodiments of the present disclosure. The communication may comprise a Wireless I/F module 1904, a Power Source 1920, at least one memory 1918, a central processing unit 1914 comprising at least one compressor and at least one secondary storage 1916. The Wireless I/F module 1904 may further comprise a MAC sublayer 1908 and a PHY sublayer 1906. The MAC sublayer 1908 comprises a Priority Service Periods Management Module 1910 that manages the Priority Service Periods of which the apparatus is a member and keep a record of all Prioritized SPs in the BSS in the Records of Priority Service Period 1912. The Wireless I/F module 1904, the CPU 1914, the at least one memory 1918 and the at least one secondary storage 1916 may function together as circuitry of the communication apparatus 1800 configured to generate TWT request frame, PS-Poll frame, QoS Null frame, BlockAck frame, TB PPDU (e.g. L.L. UL PPDU, UL PPDU), CTS frame, NSEP request frame, NSEP frame and TWT Setup frame for prioritized traffic (e.g. low latency traffic) as described in the present disclosure. The antenna

1802 may then transmit the generated frame(s) or PPDU(s) to other communication apparatus, e.g. AP(s). The antenna 1802 may receive TWT response frame, Trigger frame, Multi-STA BlockAck frame, DL MU PPDU, Beacon frame L.L. DL PPDU, frame comprising a TWT element, RTS/CTS frame, TWT information frame, NSEP response frame, NSEP frame and TWT Setup frame from other communication apparatus, e.g. AP(s), for prioritized traffic (e.g. low latency traffic) as described in the present disclosure. The circuitry of the communication apparatus 1800 may then be configured to process the received frame(s) or PPDU(s).

As described above, the embodiments of the present disclosure provide an advanced communication system, communication methods and communication apparatuses for prioritized traffic, more particularly low latency traffic, in EHT WLAN.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such a communication apparatus include a phone (e.g. cellular (cell) phone, smart phone), a tablet, a personal computer (PC) (e.g. laptop, desktop, netbook), a camera (e.g. digital still/video camera), a digital player (digital audio/video player), a wearable device (e.g. wearable camera, smart watch, tracking device), a game console, a digital book reader, a telehealth/telemedicine (remote health and medicine) device, and a vehicle providing communication functionality (e.g. automotive, airplane, ship), and various combinations thereof.

The communication apparatus is not limited to be portable or movable, and may also include any kind of apparatus, device or system being non-portable or stationary, such as a smart home device (e.g. an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

It will be understood that while some properties of the various embodiments have been described with reference to a device, corresponding properties also apply to the methods of various embodiments, and vice versa.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects illustrative and not restrictive.

According to the present disclosure, the following examples have been illustrated:

1. A communication apparatus, comprising: a receiver, which, in operation, receives from another communication apparatus a notification of one or more priority service periods (SPs), each SP being a time period in which only frames belonging to a traffic type designated by the other communication apparatus are allowed to be transmitted; and circuitry, which, in operation, determines if at least one frame of the designated traffic type is to be transmitted in one of the one or more SPs, and refrains from transmitting during the one of the one or more SPs in response to the determination that there are no frames of the designated traffic type to be transmitted.

2. The communication apparatus of example 1, wherein the circuitry is further configured to generate to the other communication apparatus a first request signal specifying a set of parameters for the one of the one or more SPs, the first request signal including at least one of a minimum wake up duration, a wake interval and a channel; and wherein the receiver further receives from the other communication apparatus a first response signal indicating an acceptance of the set of parameters specified for the one of the one or more SPs; and wherein the circuitry is further configured to, in response to receiving the first response signal, determine that the communication apparatus is associated with the one of the one or more SPs and set up with the set of parameters for transmissions during the one of the one or more SPs.

3. The communication apparatus of example 1, wherein the receiver further receives from the other communication apparatus a second request signal specifying a set of parameters for the one of the one or more SPs, the second request signal including at least one of a minimum wake up duration, a wake interval and a channel; and wherein the circuitry is further configured to, in response to receiving the second request signal, generate to the other communication apparatus a second response signal indicating an acceptance of the set of parameters specified for the one of the one or more SPs, determine that the communication apparatus is associated with the one of the one or more SPs and set up with the set of parameters for transmission during the one of the one or more SPs.

4. The communication apparatus of example 1, wherein the circuitry is further configured to: generate a third request signal to the other communication apparatus, the third request signal comprising a request to initiate the transmissions during the one of the one or more SPs; and wherein the receiver further receives a third response signal from the other communication apparatus, the response signal indicating that the communication apparatus is allowed to initiate the transmissions during the one of the one or more SPs.

5. The communication apparatus of example 1, wherein the one of the one or more SPs is a broadcast Target Wake Time service period (TWT SP) carrying an indication of restrictions of the one of the one or more SPs and specifying the designated traffic type that are allowed to be transmitted during the one of the one or more SPs, and the circuitry is further configured to generate one or more frames of the designated traffic type within the one of the one or more SPs.

6. The communication apparatus of example 1, wherein the designated traffic type is one of a low latency traffic or a National Security and Emergency Preparedness traffic.

7. The communication apparatus of example 2 or 3, wherein the receiver further receives, during the one of the one or more SPs, a legacy frame carrying a network allocation vector (NAV) exclusion field; and wherein the circuitry is further configured to, in response to determining that the communication apparatus is associated with the one of the one or more SPs, refrain from setting the NAV of the communication apparatus, regardless of whether the legacy frame is addressed to the communication apparatus or not.

8. The communication apparatus of example 7, wherein the legacy frame is a Request To Send (RTS) frame carrying a first NAV exclusion field with a NAV exclusion field value and addressed to the communication apparatus; and wherein the circuitry is further configured to generate a Clear To Send (CTS) frame carrying a second NAV exclusion field set to the NAV exclusion field value.

9. The communication apparatus of example 1, wherein the one of the one or more SPs is a broadcast Target Wake Time service period (TWT SP) carrying an indication of restrictions of the one of the one or more SPs; and wherein the receiver further receives one or more Trigger frames during the one of the one or more SPs specifying the designated traffic type that are allowed to be transmitted in a response frame.

10. The communication apparatus of example 1, wherein the receiver receives from the other communication apparatus a normal OFDMA (orthogonal frequency division multiple access) Contention Window (OCW) range for a normal Uplink OFDMA-based Random Access (UORA) and a prioritized OCW range; wherein the circuitry is configured to compute parameters of a prioritized UORA based on the received prioritized OCW range; and wherein the receiver further receives one or more Trigger frames, each of the one or more Trigger frames allocating one or more Random Access Resource Units (RA-RUs) and specifying the designated traffic type that are allowed to be transmitted in a response frame.

11. A communication method performed by a communication apparatus, comprising: receiving from another communication apparatus a notification of one or more priority service periods (SPs), each SP being a time period in which only frames belonging to a traffic type designated by the other communication apparatus are allowed to be transmitted; determining if at least one frame of the designated traffic type is to be transmitted in one of the one or more SPs; and refraining from transmitting during the one of the one or more SPs in response to the determination that there are no frames of the designated traffic type to be transmitted.

12. The communication method of example 11, further comprising: generating to the other communication apparatus a first request signal specifying a set of parameters for the one of the one or more SPs, the first request signal including at least one of a wake up time, a minimum wake up duration, a wake interval and a channel; receiving from the other communication apparatus a first response signal indicating an acceptance of the set of parameters specified for the one of the one or more SPs; and in response to receiving the first response signal: determining that the communication apparatus is associated with the one of the one or more SPs; and setting up with set of parameters for transmissions during the one of the one or more SPs.

13. The communication method of example 11, further comprising: receiving from the other communication apparatus a second request signal specifying a set of parameters for the one of the one or more SPs, the second request signal including at least one of a wake up time, a minimum wake up duration, a wake interval and a channel; and in response to receiving the second request signal: generating to the other communication apparatus a second response signal indicating an acceptance of the set of parameters specified for the one of the one or more SPs; determining that the communication apparatus is associated with the one of the one or more SPs; and setting up with the set of parameters for transmission during the one of the one or more SPs.

14. The communication method of example 11, further comprising: generating a third request signal to the other communication apparatus, the third request signal comprising a request to initiate the transmissions during the one of the one or more SPs; and receiving a third response signal from the other communication apparatus, the third response signal indicating that the communication apparatus is allowed to initiate the transmissions during the one of the one or more SPs.

15. The communication method of example 11, wherein the one of the one or more SPs is a broadcast Target Wake Time service period (TWT SP) carrying an indication of restrictions of the one of the one or more SPs and specifying the designated traffic type that are allowed to be transmitted during the one of the one or more SPs; and further comprising generating one or more frames of the designated traffic type within the one of the one or more SPs.

16. The communication method of example 11, wherein the designated traffic type is one of a low latency traffic or a National Security and Emergency Preparedness traffic.

17. The communication method of example 12 or 13, further comprising receiving, during the one of the one or more SPs, a legacy frame carrying a network allocation vector (NAV) exclusion field, and, in response to determining that the communication apparatus is associated with the one of the one or more SPs, refraining from setting the NAV of the communication apparatus, regardless of whether the legacy frame is addressed to the communication apparatus or not.

18. The communication method of example 17, wherein the legacy frame is a Request To Send (RTS) frame carrying a first NAV exclusion field with a NAV exclusion field value and addressed to the communication apparatus' and further comprising generating a Clear To Send (CTS) frame carrying a second NAV exclusion field set to the NAV exclusion field value.

19. The communication method of example 11, wherein the one of the one or more SPs is a broadcast Target Wake Time service period (TWT SP) carrying an indication of restrictions of the one of the one or more SPs; and further comprising receiving one or more trigger frames during the one of the one or more SPs specifying the designated traffic type that are allowed to be transmitted in a response frame.

20. The communication method of example 11, further comprising receiving from the other communication apparatus a normal OFDMA (orthogonal frequency division multiple access) Contention Window (OCW) range for a normal Uplink OFDMA-based Random Access (UORA) and a prioritized OCW range; computing parameters of a prioritized UORA based on the received prioritized OCW range; and receiving one or more Trigger frames, each of the one or more Trigger frames allocating one or more Random Access Resource Units (RA-RUs) and specifying the designated traffic type that are allowed to be transmitted in a response frame.

The invention claimed is:

1. A communication apparatus, comprising:

a receiver, which, in operation, receives from another communication apparatus a notification of one or more priority service periods (SPs), each SP being a time period in which transmission of frames belonging to a traffic type different from a traffic type designated by the other communication apparatus is restricted; and circuitry, which, in operation, determines if at least one frame of the designated traffic type is to be transmitted in one of the one or more SPs, and refrains from transmitting during the one of the one or more SPs in response to the determination that there are no frames of the designated traffic type to be transmitted, wherein:

the circuitry, in operation, controls transmission to the other communication apparatus of a first request signal specifying a set of parameters for the one of the one or more SPs, the first request signal including: a wake up time, a minimum wake up duration, a wake interval, a channel, or combinations thereof;

the receiver, in operation, receives from the other communication apparatus a first response signal indicating an acceptance of the set of parameters specified for the one of the one or more SPs; and the circuitry, in response to receiving the first response signal, determines that the communication apparatus is associated with the one of the one or more SPs and set up with the set of parameters for transmissions during the one of the one or more SPs.

2. The communication apparatus of claim 1, wherein:

the receiver, in operation, receives from the other communication apparatus a second request signal specifying a set of parameters for the one of the one or more SPs, the second request signal including: a wake up time, a minimum wake up duration, a wake interval, a channel, or combinations thereof; and the circuitry, in response to receiving the second request signal:

controls transmission to the other communication apparatus of a second response signal indicating an acceptance of the set of parameters specified in the second request signal for the one of the one or more SPs, and determines that the communication apparatus is associated with the one of the one or more SPs and set up with the set of parameters for transmission during the one of the one or more SPs.

3. The communication apparatus of claim 1, wherein:

the circuitry, in operation, controls transmission, to the other communication apparatus, of a request to initiate the transmissions during the one of the one or more SPs; and the receiver, in operation, receives a response signal to the request to initiate the transmissions from the other communication apparatus, the response signal to the request to initiate the transmissions indicating that the communication apparatus is allowed to initiate the transmissions during the one of the one or more SPs.

4. The communication apparatus of claim 1, wherein the one of the one or more SPs is a broadcast Target Wake Time service period (TWT SP) carrying an indication of restrictions of the one of the one or more SPs and specifying the designated traffic type, and the circuitry is configured to generate one or more frames of the designated traffic type within the one of the one or more SPs.

5. The communication apparatus of claim 1, wherein the designated traffic type is one of a low latency traffic or a National Security and Emergency Preparedness traffic.

6. The communication apparatus of claim 1, wherein the receiver receives, during the one of the one or more SPs, a legacy frame carrying a network allocation vector (NAV) exclusion field; and wherein the circuitry is configured to, in response to determining that the communication apparatus is associated with the one of the one or more SPs, refrain from setting the NAV of the communication apparatus, regardless of whether the legacy frame is addressed to the communication apparatus or not.

7. The communication apparatus of claim 6, wherein the legacy frame is a Request To Send (RTS) frame carrying a first NAV exclusion field with a NAV exclusion field value and addressed to the communication apparatus; and wherein the circuitry is configured to generate a Clear To Send (CTS) frame carrying a second NAV exclusion field set to the NAV exclusion field value.

8. The communication apparatus of claim 1, wherein the one of the one or more SPs is a broadcast Target Wake Time service period (TWT SP) carrying an indication of restrictions of the one of the one or more SPs; and wherein the receiver receives one or more Trigger frames during the one of the one or more SPs specifying the designated traffic type.

9. The communication apparatus of claim 1, wherein the receiver receives from the other communication apparatus a normal OFDMA (orthogonal frequency division multiple access) Contention Window (OCW) range for a normal Uplink OFDMA-based Random Access (UORA) and a prioritized OCW range; wherein the circuitry is configured to compute parameters of a prioritized UORA based on the received prioritized OCW range; and wherein the receiver receives one or more Trigger frames, each of the one or more Trigger frames allocating one or more Random Access Resource Units (RA-RUs) and specifying the designated traffic type.

10. A communication method performed by a communication apparatus, comprising:

receiving from another communication apparatus a notification of one or more priority service periods (SPs), each SP being a time period in which transmission of frames belonging to a traffic type different from a traffic type designated by the other communication apparatus is restricted;

determining if at least one frame of the designated traffic type is to be transmitted in one of the one or more SPs;

refraining from transmitting during the one of the one of more SPs in response to the determination that there are no frames of the designated traffic type to be transmitted;

transmitting to the other communication apparatus a first request signal specifying a set of parameters for the one of the one or more SPs, the first request signal including: a wake up time, a minimum wake up duration, a wake interval, a channel, or combinations thereof;

receiving from the other communication apparatus a first response signal indicating an acceptance of the set of parameters specified for the one of the one or more SPs; and in response to receiving the first response signal, determining that the communication apparatus is associated with the one of the one or more SPs and set up with the set of parameters for transmissions during the one of the one or more SPs.

11. The communication method of claim 10, comprising:

receiving from the other communication apparatus a second request signal specifying a set of parameters for the one of the one or more SPs, the second request signal including a wake up time, a minimum wake up duration, a wake interval, a channel, or combinations thereof; and in response to receiving the second request signal:

transmitting to the other communication apparatus a second response signal indicating an acceptance of the set of parameters specified in the second request signal for the one of the one or more SPs;

determining that the communication apparatus is associated with the one of the one or more SPs; and setting up with the set of parameters for transmission during the one of the one or more SPs.

12. The communication method of claim 10, comprising:

transmitting to the other communication apparatus a request to initiate the transmissions during the one of the one or more SPs; and receiving a response signal to the request to initiate the transmissions from the other communication apparatus, the response signal to the requests to initiate the transmissions indicating that the communication apparatus is allowed to initiate the transmissions during the one of the one or more SPs.

13. The communication method of claim 10, wherein the one of the one or more SPs is a broadcast Target Wake Time service period (TWT SP) carrying an indication of restrictions of the one of the one or more SPs and specifying the designated traffic type; and the method comprises generating one or more frames of the designated traffic type within the one of the one or more SPs.

14. The communication method of claim 10, wherein each of the SPs is a time period in which only frames belonging to the designated traffic type are allowed to be transmitted.

15. The communication apparatus of claim 1, wherein each of the SPs is a time period in which only frames belonging to the designated traffic type are allowed to be transmitted.

* * * * *